United States Patent [19]
Jermakian et al.

[11] Patent Number: 6,137,203
[45] Date of Patent: Oct. 24, 2000

[54] ELECTRIC MOTOR WITH ACTIVE HYSTERESIS-BASED CONTROL OF WINDING CURRENTS AND/OR HAVING AN EFFICIENT STATOR WINDING ARRANGEMENT AND/OR ADJUSTABLE AIR GAP

[75] Inventors: Joel B. Jermakian, Hillsboro; Stephen G. Crain, Falls Church; Cory D. Knudtson, Reston; Robert F. D. Piacesi, Sterling, all of Va.

[73] Assignee: New Generation Motors Corporation, Ashburn, Va.

[21] Appl. No.: 09/318,742

[22] Filed: May 26, 1999

Related U.S. Application Data

[62] Division of application No. 08/990,134, Dec. 12, 1997.

[51] Int. Cl.[7] .......................... H02K 21/00; H02K 21/26; H02K 1/12; H02K 1/22
[52] U.S. Cl. ........................... 310/191; 310/268; 310/266
[58] Field of Search ..................................... 310/191, 209, 310/268, 75 D, 254, 266

[56] References Cited

U.S. PATENT DOCUMENTS

| | | | |
|---|---|---|---|
| 614,608 | 11/1898 | Cantono | 310/209 |
| 1,737,128 | 11/1929 | Ross | 310/166 |
| 2,861,238 | 11/1958 | Kober | 310/191 |
| 3,233,133 | 2/1966 | Kober | 310/191 |
| 3,469,130 | 9/1969 | Jines et al. | 310/191 |
| 5,473,209 | 12/1995 | Lamb | 310/75 D |
| 5,646,467 | 7/1997 | Floresta et al. | 310/268 |
| 5,834,874 | 11/1998 | Krueger et al. | 310/191 |

*Primary Examiner*—Clayton LaBalle
*Attorney, Agent, or Firm*—Pillsbury Madison & Sutro LLP

[57] ABSTRACT

An electric motor is provided with active hysteresis-based control of winding current. The motor has an efficient stator winding arrangement, as well as at least one adjustable air gap. Also provided is a stator, windings and air gap adjustment mechanism, as well as a method and system for controlling the torque produced by the motor using active hysteresis-based control of the motor's winding currents. The stator has its windings distributed among arc sections, the windings in each arc section being associated with only one phase of the motor. The hysteresis-based control of winding current is active in that a bandwidth or spread of the hysteresis band is adjusted depending on at least one of several selectively determined factors. The motor and its associated components are particularly well-suited for use in an electrically powered vehicle, as well as in hybrid vehicles using both electric power from a battery and electric power derived from a fuel-burning engine. A current detector is provided for generating outputs indicative of current flowing through each of three phase windings in a motor, based on detected magnitudes of current flowing through only two of the phase windings. Also provided is a discharge device for discharging residual voltage on a power bus of an electric vehicle.

5 Claims, 21 Drawing Sheets

FIG. 7

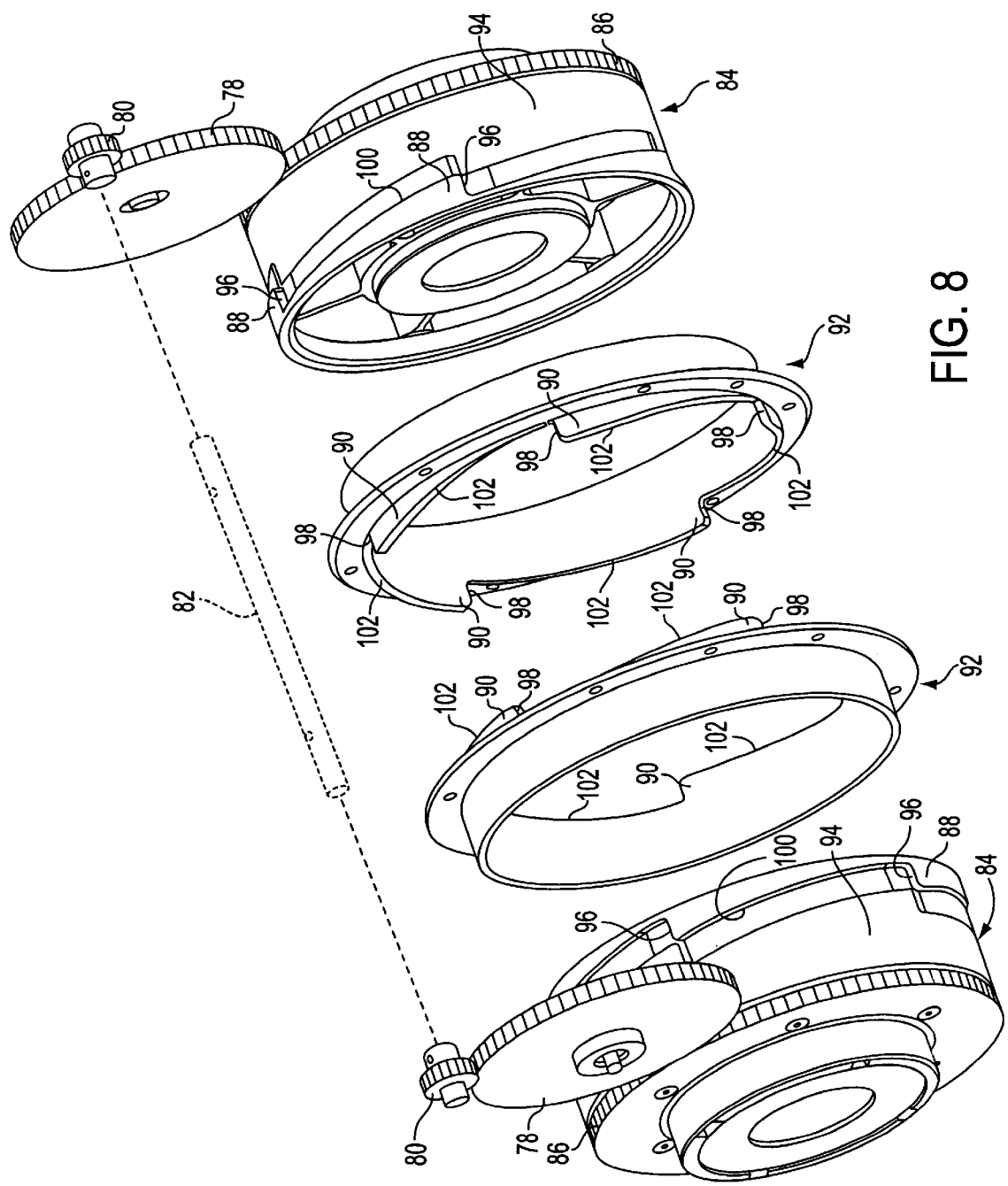

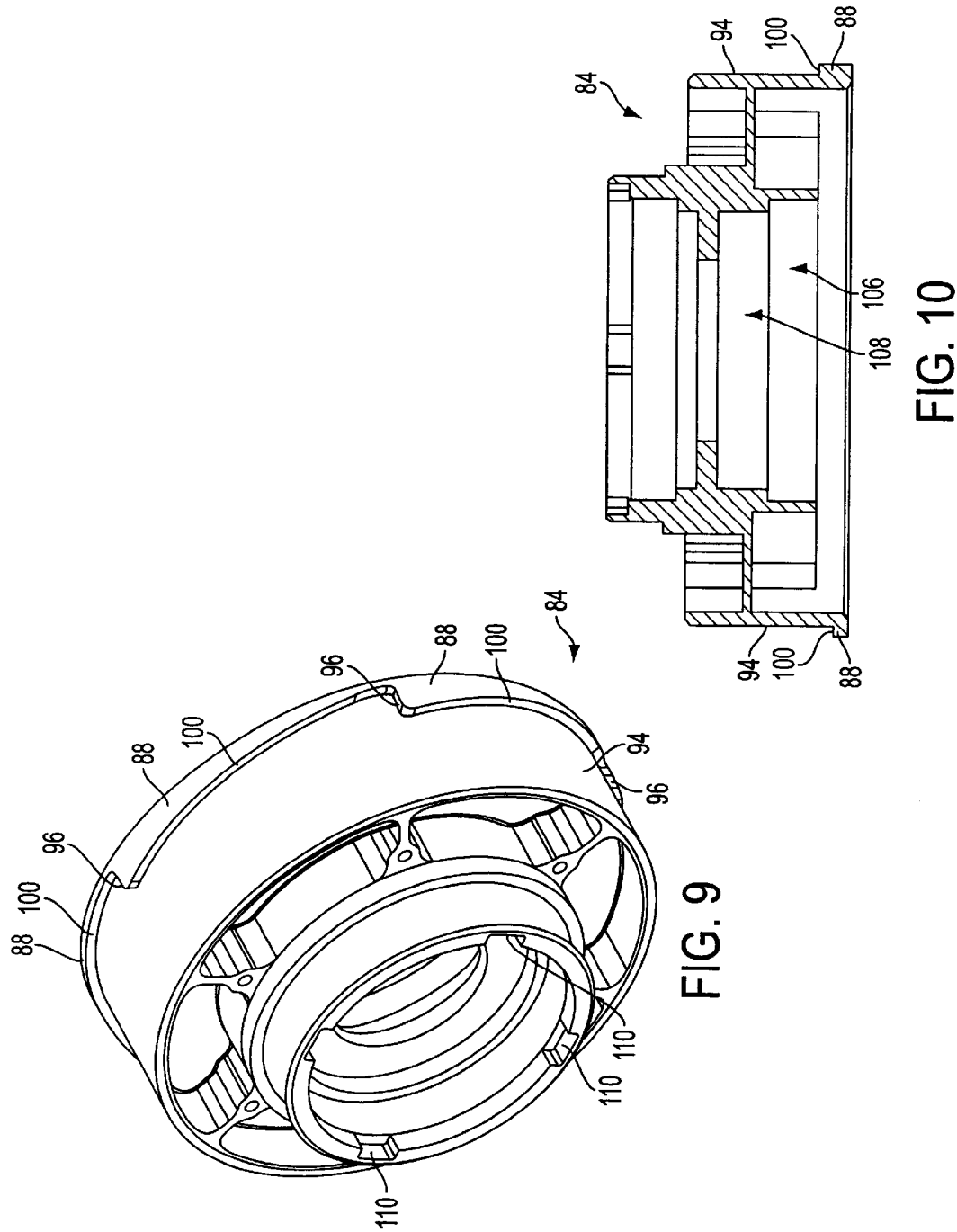

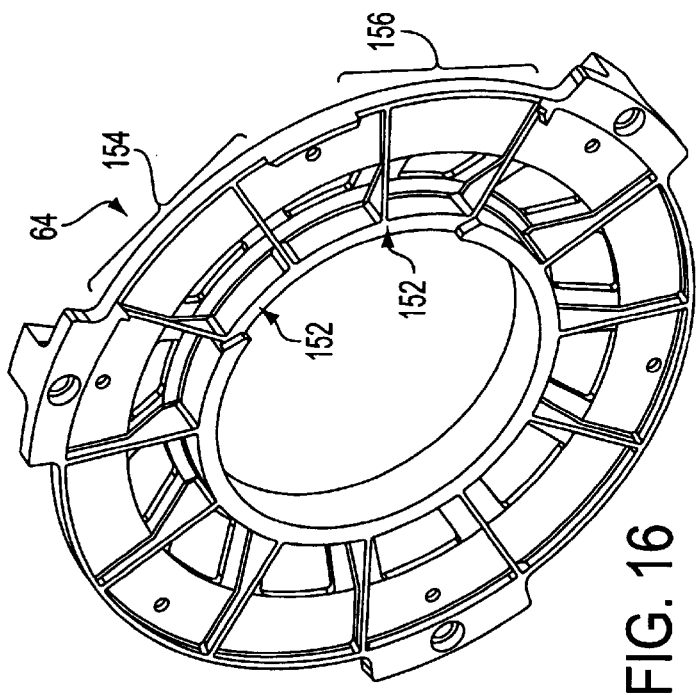
FIG. 17
FIG. 16
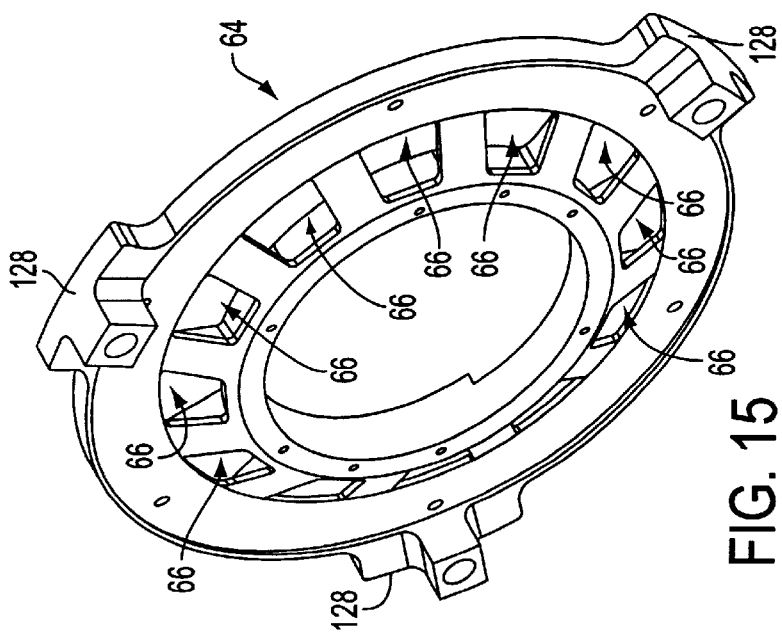
FIG. 15

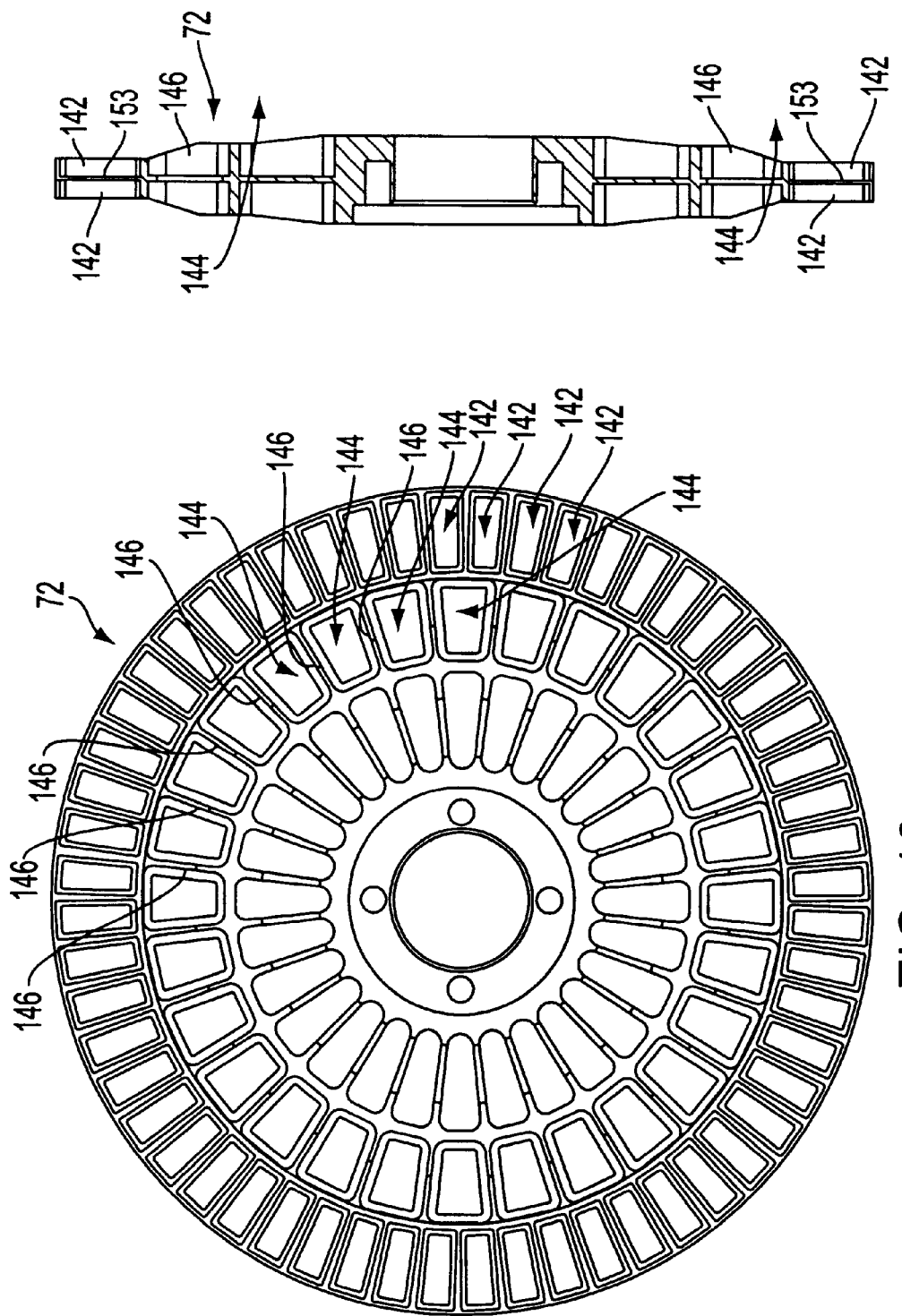

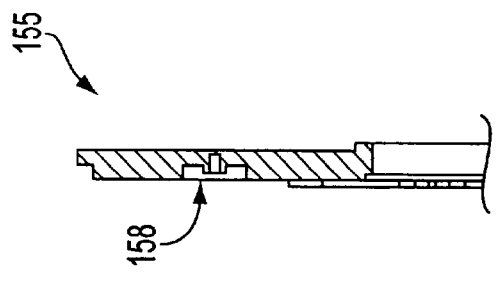
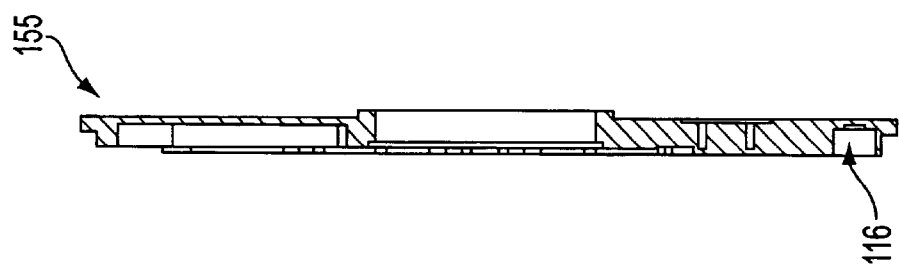
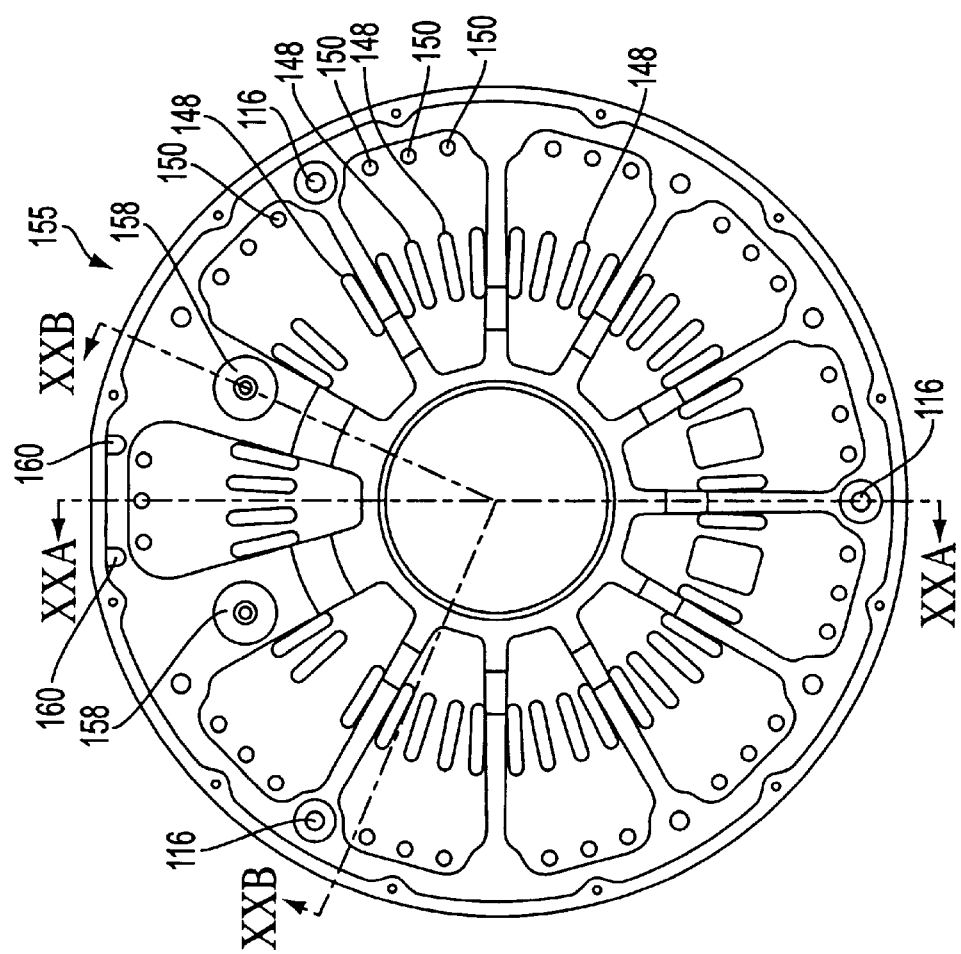

ELECTRIC MOTOR WITH ACTIVE HYSTERESIS-BASED CONTROL OF WINDING CURRENTS AND/OR HAVING AN EFFICIENT STATOR WINDING ARRANGEMENT AND/OR ADJUSTABLE AIR GAP

This is a division of application Ser. No. 08/990,134, filed Dec. 12, 1997.

BACKGROUND OF THE INVENTION

The present invention relates to an electric motor with active hysteresis-based control of winding currents, and/or having an efficient stator winding arrangement, and/or adjustable air gap. The present invention also relates to the stator, windings and air gap adjustment mechanism included in the electric motor, as well as a method and system for controlling the torque produced by the motor using active hysteresis-based control of the motor's winding currents. The motor and its associated components are particularly well-suited for use in an electrically powered vehicle, as well as in hybrid vehicles using both electric power from a battery and electric power derived from a fuel-burning engine.

In the field of electrically-powered vehicles and hybrid vehicles, it is known that efficiency and versatility of a motor are key elements in a successful design. Another key element is the vehicle's weight and the motor's contribution to weight. These key elements have a significant impact on the range of the vehicle and its usefulness to consumers. These key elements also affect one another. A reduction in weight, for example, may have a negative impact on versatility. In this regard, removal of a gearing mechanism to reduce weight may limit the speed of the vehicle and hence its versatility, while improving the vehicle's efficiency and overall range.

Not all improvements, however, have negative implications with regard to other key elements. An improvement in one key element actually may provide a synergistic improvement in another of the key elements. Versatility, for example, can reduce the overall weight of a vehicle. Motors having a wide range of torque-producing speeds are more versatile and also result in a reduced need for heavy gearing elements and complicated or electrically inefficient controlling arrangements. Thus, an improvement in the motor's versatility translates into a reduction in the vehicle's overall weight and improved efficiency. The present invention aims to maximize the positive interplay between these key elements, while at the same time reducing the negative impact between the key elements.

There are many commercially available electric motors, some of which may provide improvements in one or more of the key elements described above. The following patents are examples of known electric motors:

| PATENT NO. | PATENTEE |
| --- | --- |
| 3,325,661 | Parsons |
| 3,497,730 | Doolittle |
| 3,600,619 | Tiarks |
| 3,886,383 | Ross et al. |
| 4,080,724 | Gillette |
| 4,288,709 | Matthias et al. |
| 4,307,309 | Barrett |
| 4,319,152 | van Gils |

-continued

| PATENT NO. | PATENTEE |
| --- | --- |
| 4,331,896 | Sedgewick |
| 4,340,833 | Sudo et al. |
| 4,363,988 | Kliman |
| 4,390,805 | Hahn |
| 4,517,478 | Oudet |
| 4,665,329 | Raschbichler |
| 4,752,707 | Morrill |
| 4,754,207 | Heidelberg et al. |
| 4,803,389 | Ogawa et al. |
| 4,812,696 | Stanley |
| 4,883,999 | Hendershot |
| 4,890,024 | Hashimoto et al. |
| 4,959,578 | Varga |
| 4,996,457 | Hawsey et al. |
| 5,006,745 | Nishio et al. |
| 5,028,830 | Mas |
| 5,036,235 | Kleckner |
| 5,111,098 | Peck et al. |
| 5,117,141 | Hawsey et al. |
| 5,168,187 | Baer et al. |
| 5,177,392 | Scott |
| 5,189,323 | Carr et al. |
| 5,191,255 | Kloosterhouse et al. |
| 5,208,503 | Hisey |
| 5,296,778 | Stroud |
| 5,325,007 | Huss et al. |
| 5,396,140 | Goldie et al. |
| 5,397,953 | Cho |
| 5,440,185 | Allwine, Jr. |
| 5,455,474 | Flynn |
| 5,498,919 | Bahn |
| 5,589,722 | Sakaguchi et al. |
| 5,608,278 | Mey et al. |
| 5,637,945 | Yamamuro et al. |
| 5,642,009 | McCleer et al. |
| 5,646,465 | Paweletz |

SUMMARY OF THE INVENTION

A primary object of the present invention is to overcome the disadvantages associated with known electric motors, by maximizing the synergistic interplay between the aforementioned key elements.

Another object of the present invention is to provide an electric motor having a controller capable of performing active hysteresis-based control of winding currents in a manner dependent on the desired torque or winding current level, the speed of the motor (RPM), and/or other variables, for example, to selectively balance a switching efficiency of the motor's controller and resistive losses in the windings and/or to selectively provide a reduction in motor noise.

Yet another object of the present invention is to provide a stator having an electrically and magnetically efficient winding arrangement.

Still another object of the present invention is to provide a mechanism capable of adjusting the motor's air gap, thereby improving the versatility of the motor in a gear-less manner by allowing the motor to produce a high level of torque at low speeds, while the air gap is small, and allowing the motor to continue producing torque, when the air gap is larger, at higher speeds than would be permitted with the smaller air gap.

Yet another object of the present invention is to provide a discharge circuit for automatically discharging a voltage on a power bus between a motor's controller and the motor itself after the voltage on the power bus decays to a predetermined decay minimum.

To achieve these and other objects, the present invention provides a stator for an axial flux motor powered using at least two phases of electrical current. The stator includes a series of stator windings. The series is arranged in a circle which defines a circumference of the stator. The series of windings have arc sections, each of the arc sections containing windings associated with only one of the phases. The arc sections are arranged such that, when current flows through the windings, each arc section provides a magnetic field which, at any given instant of time during current flow, alternates in direction along a length of each arc segment.

The windings in each arc section may be arranged so that no two arc segments carry current of identical phase. Alternatively, more than one arc section may be associated with each phase. Preferably, the distribution of arc sections provides a favorable symmetry around the stator's circumference. For example, in a three phase, six arc section motor, the two arc sections associated with each phase are 180 degrees apart, which provides symmetry with respect to the spin axis. Other symmetries may be achieved using different configurations.

The stator preferably includes an annular stator core. The annular stator core includes a radially inner surface, a radially outer circumferential surface, and two sides extending therebetween. The annular stator core further includes slots which extend between the radially outer circumferential surface and the radially inner surface to define teeth on one of the two sides of the annular stator core. The stator windings are defined by conductive material extending through the slots and around the teeth.

The stator windings may be defined by serpentine-shaped conductors which fit between and around the stator's teeth, each serpentine-shaped conductor being coextensive with a respective one of the arc segments.

The serpentine-shaped conductors in each arc segment are stacked upon one another with an electrically insulative material disposed therebetween. The stack in each arc segment preferably includes a first set of substantially identical serpentine-shaped conductors stacked alternatingly through the stack, and a second set of serpentine-shaped conductors sandwiched between the serpentine-shaped conductors of the first set. The serpentine-shaped conductors of the second set are substantially identical to one another but different from those of the first set in that, when the first and second sets are alternatingly stacked, portions of the serpentine-shaped conductors in the first set which are outside of the slots extend around opposites sides of the teeth from portions of the serpentine-shaped conductors of the second set which are also outside of the slots.

The electrically insulative material between the conductors preferably includes openings through which adjacent ones of the serpentine-shaped conductors in each stack are electrically connected. The openings are arranged so that current flowing through each arc segment flows end-to-end through each serpentine-shaped conductor of that arc segment.

In order to reduce resistive losses in the portions of the serpentine-shaped conductors which are outside of the slots, such portions may have a larger cross sectional area than other portions of the serpentine-shaped conductors which are located in the slots.

The foregoing stator is preferably incorporated into an axial flux motor powered using at least two phases of electrical current. In addition to the stator, the axial flux motor includes a rotor having an outer circumference carrying magnetic field producing elements. The magnetic field producing elements are arranged so as to produce a magnetic field that alternates in direction around the circumference of the rotor. Preferably, the magnetic field producing elements are permanent magnets.

The stator is axially spaced from the rotor to define an air gap therebetween. In addition, the stator is selectively movable in an axial direction from the rotor to vary this air gap. Preferably, a mechanism is provided for axially moving the stator and thereby varying the air gap.

The motor can be arranged in a dual stator configuration. In this regard, a second stator may be provided in accordance with the present invention on an opposite side of the rotor from the first stator. The second stator preferably is arranged so as to constitute a mirror image of the first stator.

Preferably, both the first and second stators are axially spaced from the rotor to define first and second air gaps, and both stators are selectively movable in the axial direction to vary the air gaps. First and second mechanisms for varying the air gaps may be provided.

A coupling mechanism also may be provided for coupling actuation of the first mechanism to actuation of the second mechanism, so that variations in the first air gap produce substantially identical variations in the second air gap.

The present invention also provides a winding arrangement for a motor. The winding arrangement includes a magnetic core having teeth defined by slots in the magnetic core, and at least one conductive winding passing in and out of the slots. The conductive winding has portions outside of the slots which have a larger cross sectional area than portions of the conductive winding which are located inside the slots.

Preferably, the winding arrangement includes serpentine-shaped conductors which fit between and around the teeth.

The present invention also provides a dual stator motor with selectively variable air gaps. The dual stator motor includes first and second stators which are axially movable, a rotor rotatably mounted between the first and second stators for rotation in response to magnetic fields generated by the stators, a first mechanism for moving the first stator axially with respect to the rotor to vary a first air gap, and a second mechanism for moving the second stator axially with respect to the rotor to vary a second air gap.

A coupling mechanism preferably is provided for coupling actuation of the first mechanism to actuation of the second mechanism so that the first air gap remains substantially the same as the second air gap.

Each of the first and second mechanisms preferably includes a cam hub having camming members, and stator camming elements mounted to a respective one of the first and second stators. The stator camming elements match the camming members of the cam hub. The cam hub is rotatable in a first direction wherein the camming members of the cam hub urge the stator camming elements away from the rotor and a second direction wherein the camming members of the cam hub permit the stator camming elements to move closer to the rotor.

Preferably, each of the first and second mechanisms includes at least one resilient member arranged so as to urge a respective one of the first and second stators away from the rotor with a counter-active force which counteracts an attractive force between the respective stator and the rotor.

The resilient member is arranged so that the counter-active force increases as the respective one of the first and second stators approaches a position associated with a minimum air gap. The resilient member therefore advantageously reduces the loading on thrust bearings of the motor.

Preferably, each of the first and second mechanisms further includes an additional resilient member for positively loading the respective one of the first and second stators toward the rotor so that the camming members remain in contact with the stator camming elements.

The present invention also provides a motor controller for controlling a multi-phase D.C. motor. The motor controller includes switching elements for connection electrically between a D.C. power supply and windings associated with respective phases of the motor, current detection lines which carry signals indicative of current flowing through respective ones of the windings, and a control unit responsive to the current detection lines.

The control unit controls each switching element to initially close at the beginning of a respective commutation step, then to open when current through a respective one of the windings achieves a first predetermined value and to close again when the current through the respective one of the windings drops below a second predetermined value. This process of opening (when the second predetermined value is reached) and closing (when the current falls to the second predetermined value) the switching elements continues over each commutation step.

The first and second predetermined values define a hysteresis bandwidth therebetween and are determined based on an intermediate value of current desired for the present commutation step of the motor. The control unit is arranged so as to selectively vary the hysteresis bandwidth.

The hysteresis bandwidth may be varied in a manner which minimizes the sum of switching power losses associated with the switching elements and resistive power losses associated with winding resistance. The hysteresis bandwidth also may be varied so that audible and/or undesirable noise is reduced.

The control unit may be responsive to a signal indicative of an amount of torque desired and may be arranged so as to set the first and second predetermined values accordingly.

In the context of a three-phase, wye-connected D.C. motor, the motor controller includes a first switch for connection electrically between a first terminal of a D.C. power supply and windings associated with a first phase of the motor, a second switch for connection electrically between the first terminal of the D.C. power supply and windings associated with a second phase of the motor, a third switch for connection electrically between the first terminal of the D.C. power supply and windings associated with a third phase of the motor, a fourth switch for connection electrically between a second terminal of the D.C. power supply and the windings associated with the first phase, a fifth switch for connection electrically between the second terminal of the D.C. power supply and the windings associated with the second phase, a sixth switch for connection electrically between the second terminal of the D.C. power supply and the windings associated with the third phase, current detection lines which carry signals indicative of current flowing through at least two of the windings, and a control unit responsive to the current detection lines.

The control unit controls each of the fourth, fifth and sixth switches so that during each commutation step of the motor a corresponding one of the fourth, fifth and sixth switches initially closes until current through a respective winding achieves a first predetermined value, at which time the corresponding one of the fourth, fifth and sixth switches opens and remains open until the current through the respective winding drops below a second predetermined value less than the first predetermined value, whereupon the corresponding one of the fourth, fifth, and sixth switches closes. This opening a closing process continues for each commutation step.

The first and second predetermined values define a hysteresis bandwidth therebetween and may be determined based on an intermediate value of current desired for a present commutation step of the motor. The control unit is arranged so as to close one of the first, second and third switches depending on the present commutation step of the motor.

In addition, the control unit is arranged so as to selectively vary the hysteresis bandwidth. The hysteresis bandwidth may be varied in any of the aforementioned ways.

Preferably, the motor controller further includes a current detection multiplexer connected between the current detection lines and the control unit. The current detection multiplexer is arranged so that, depending on which commutation step is present, the control unit receives from the current detection multiplexer one of: 1) a first signal indicative of a detected magnitude of current flowing through a first of the windings, 2) a second signal indicative of a detected magnitude of current flowing through a second of the windings, and 3) a third signal derived from the first and second signals and indicative of a magnitude of current flowing through a third of the windings.

The control unit preferably includes a programmable microcontroller capable of providing a commutation signal indicative of the present commutation step, a signal indicative of the first predetermined value, and a signal indicative of the second predetermined value. The commutation signal may be applied to the current detection multiplexer as a control signal.

The present invention also includes a current detector for providing outputs indicative of current flowing through each of three phase windings in a motor, based on detected magnitudes of current flowing through only two of the phase windings.

The current detector of the present invention includes a current detection multiplexer for connection to a signal indicative of a present commutation step of the motor. The current detection multiplexer is arranged so that, depending on which commutation step is present, the current detection multiplexer outputs one of 1) a first signal indicative of a detected magnitude of current flowing through a first of the windings, 2) a second signal indicative of a detected magnitude of current flowing through a second of the windings, and 3) a third signal derived from the first and second signals and indicative of a magnitude of current flowing through a third of the windings.

The current detector preferably includes a first current sensor for detecting the magnitude of current flowing through the first of the windings, and a second current sensor for detecting the magnitude of current flowing through the second of the windings. The current detector also may include a resistor network for scaling inputs to the current detection multiplexer.

According to yet another aspect of the present invention, a current detector for a three-phase motor includes a first input port for connection to a first current sensing device which senses current in a first winding of the three-phase motor, a second input port for connection to a second current sensing device which senses current in a second winding of the three-phase motor, and summing circuitry connected to the first and second input ports. The summing circuitry provides a sum of the magnitudes of current in the first and second windings of the three-phase motor.

The current detector further includes a switching mechanism for outputting during a commutation step:

1. a signal indicative of the current in the first winding if the current in the first winding was turned on at a beginning of a prior commutation step;

2. a signal indicative of the current in the second winding if the current in the second winding was turned on at the beginning of the prior commutation step, and 3. a signal indicative of the sum if current in a third one of the windings was turned on at the beginning of the prior commutation step.

The present invention also provides a discharge device for automatically discharging a residual voltage on a power bus after the residual voltage drops below a predetermined value. The discharge device includes control circuitry connectable to the power bus. The control circuitry is capable of determining whether the residual voltage has dropped below the predetermined value and is also capable of providing a control signal indicative thereof.

The discharge device further includes a discharge switching element responsive to the control signal from the control circuitry. The discharge switching element is arranged so that when the control signal indicates that the residual voltage has dropped below the predetermined value, the discharge switching element effects discharging of the residual voltage.

The above and other objects and advantages will become more readily apparent when reference is made to the following description taken in conjunction with the accompanying drawings.

BRIEF DESCRIPTION OF THE DRAWINGS

FIG. 7 is an exploded view of a motor in accordance with the present invention.

FIG. 8 is an exploded view of mechanisms for varying air gaps of the motor illustrated in FIG. 7.

FIG. 9 is a perspective view of a camming hub according to the present invention.

FIG. 10 is a cross sectional view of the camming hub illustrated in FIG. 9.

FIG. 15 is a perspective view of a stator backplate according to the present invention.

FIG. 16 is a reverse perspective view of the stator backplate illustrated in FIG. 15.

FIG. 17 is a cross sectional view of the stator backplate illustrated in FIGS. 15 and 16.

FIG. 18 is an elevation view of the rotor illustrated in FIG. 14.

FIG. 19 is a cross sectional view of the rotor illustrated in FIGS. 14 and 18.

FIG. 20 is an elevation view of a motor end plate according to the present invention.

FIG. 20A is a cross sectional view taken along line XXA of FIG. 20.

FIG. 20B is a cross section view taken along line XXB of FIG. 20.

DESCRIPTION OF THE PREFERRED EMBODIMENTS

Figure 1:
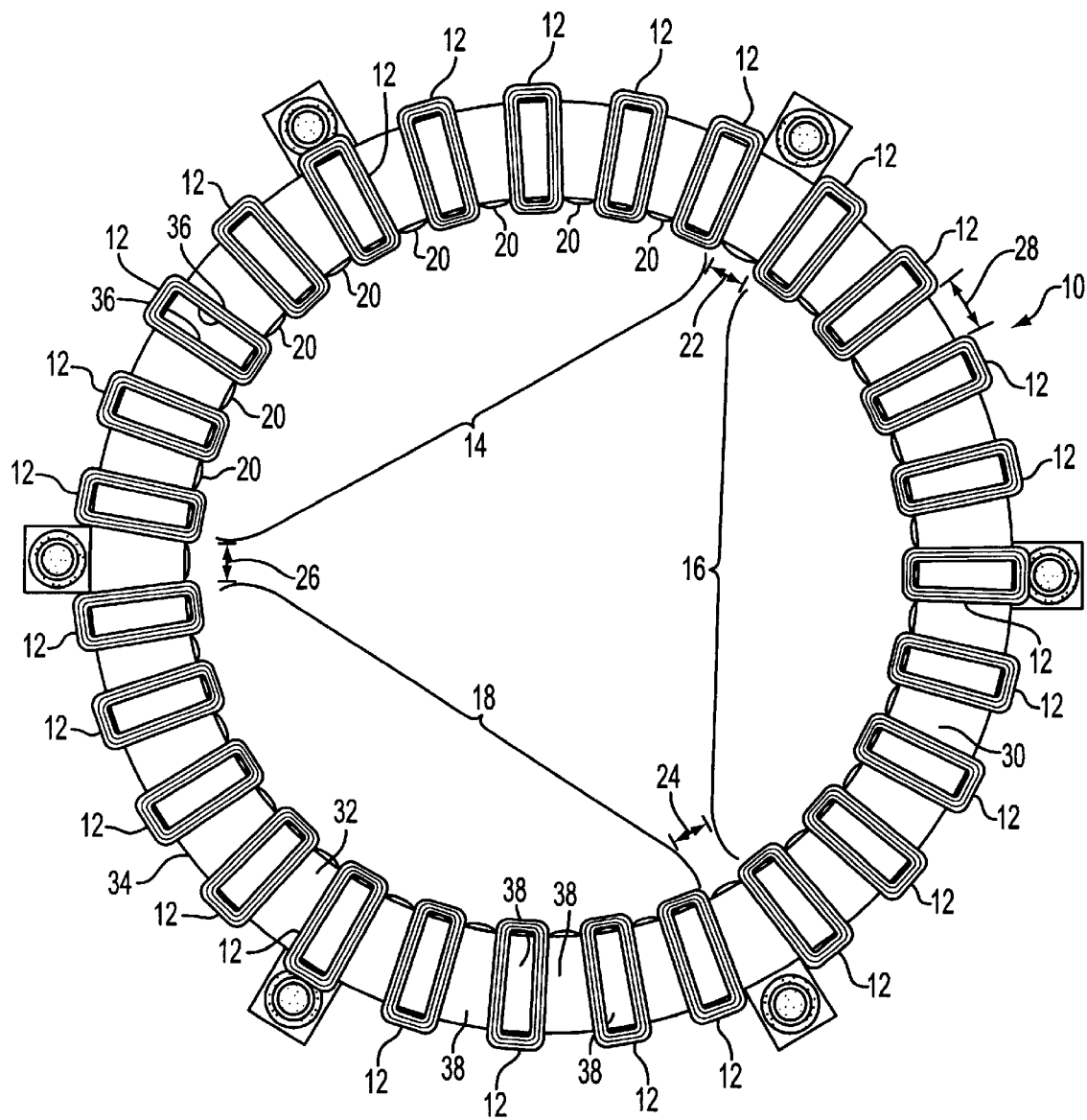
FIG. 1 is an elevation view of a stator in accordance with a preferred embodiment of the present invention.

Preferred embodiments of the present invention will now be described with reference to the accompanying drawings With reference to FIG. 1, a stator 10 for a three-phase axial flux motor includes a series of stator windings 12. The series is arranged in a circle which defines a circumference of the stator 10. The series of windings 12 has arc sections 14,16,18. Each of the arc sections 14,16,18 contains a group of windings 12 associated with only one of the three phases of electrical current. In particular, the arc sections 14,16,18 are arranged such that, when current flows through the windings 12, each arc section 14,16,18 provides a magnetic field which, at any given instant of time during current flow, alternates in direction along a length of each arc segment 14,16,18.

Thus, in FIG. 1, each of the windings 12 is wrapped in the same direction so that current on one side of the winding flows radially inward with respect to the circle defined by the stator, whereas current on the other side of the winding flows radially out. This alternating direction of current flow along the length of each arc segment 14,16,18 is what produces the aforementioned magnetic field which alternates in direction along the length of each arc segment 14,16,18.

A short conductor 20 connects the inside of a subsequent winding 12 in each arc segment 14,16,18 to the outside of a previous winding 12. Such interconnection of windings which are immediately adjacent to one another (i.e., which have no windings of another phase between them) requires significantly less copper (or other conductive material) and therefore provides significantly less resistive losses.

The magnetic losses associated with the illustrated arrangement also are significantly reduced. In particular, because windings of the same phase are immediately adjacent to one another in the illustrated arrangement, the return flux paths from an intermediate winding are through the immediately adjacent windings on each side of the intermediate winding. Thus, the return flux paths in the illustrated embodiment need not extend over windings of another phase before returning, as would be the case in arrangements wherein windings of different phases are immediately adjacent to one another. The illustrated arrangement of the present invention therefore is magnetically more efficient than arrangements wherein windings associated with different phases are immediately adjacent to one another.

Although the individual windings may be made using conventional wire and insulative material between adjacent segments of wire, a more preferred winding arrangement utilizes a wrapping of flat copper ribbon and insulative material.

This more preferred arrangement provides significant manufacturing benefits and performance advantages. The most significant performance advantages are reductions in the copper length and associated resistive losses, and reduced eddy current losses in the windings. The reduction in copper length is achieved because the individual windings 12 are connected to one another exclusively by a single conductor at the inner radius of the stator 10. This reduces the copper length by a factor of $\pi$ times the difference between the inner radius and the outer radius of the stator 10. The reduction in eddy current losses is achieved because the individual winding segments aligned with the radius of the stator 10 have very little thickness in a direction tangential to the circle defined by the stator 10. The flat ribbon also occupies more completely than conventional wire, the volume of space into which each winding fits, and thereby provides a higher slot fill volume and further reduced copper losses.

Although the illustrated stator 10 is adapted for use in an axial flux motor powered using three phases, it is understood that similar arrangements can be provided for other motors having at least two phases. In a two-phase motor, for example, there would be two arc sections (semi-circles). A four phase motor, likewise, would have four arc sections. The number of arc sections generally corresponds to the number of phases. Thus, for a motor having n phases, a stator according to the present invention generally will include n arc segments. Of particular significance in the illustrated embodiment, no two arc segments carry current of the same phase. The illustrated embodiment therefore avoids the need for numerous conductive elements long enough to connect windings of like phase over windings which are of different phase.

As illustrated in FIG. 1, the inter-phase separation spaces 22,24,26 between adjacent ones of the arc segments 14,16, 18 is different from an intra-phase separation space 28 which separates immediately adjacent windings in a single arc segment 14,16,18. This difference in spacing compensates for the difference in phase. In particular, each of the inter-phase separations 22,24,26 is five thirds of the intra-phase separation space 28.

The present invention, however, is not limited to such a relationship between inter-phase separation and intra-phase separation. Generally, there is an even number of magnet poles, and the inter-phase separation is such that the sum of the intra-phase separation spaces (which individually are the same as the magnet pole spacing) and the inter-phase separation spaces equals the sum of the magnet separation spaces.

The stator 10 further includes an annular stator core 30. The annular stator core 30 has a radially inner surface 32, a radially outer circumferential surface 34, and two sides extending therebetween. Only one of the sides is visible in the view of FIG. 1.

The annular stator core 30 further includes slots 36 which extend between the radially outer circumferential surface 34 and the radially inner surface 32 to define teeth 38 on the side of the annular stator 30 which is visible in FIG. 1. The stator windings 12 are defined by the conductive material extending through the slots 36 and around the teeth 38.

The annular stator core 30 may be manufactured using any one of several manufacturing techniques. According to a first technique, the annular stator core 30 is made by taking a toroidally wound core of soft magnetic material and machining the toroidally wound core to form the slots and teeth.

According to a second technique, a machine is employed which is capable of punching out rectangular pieces of fixed size from a toroidally wound core as it is being wound in a lamination process. The second technique, however, requires careful alignment with respect to angular position, core diameter, tension and punch position.

Figure 2:
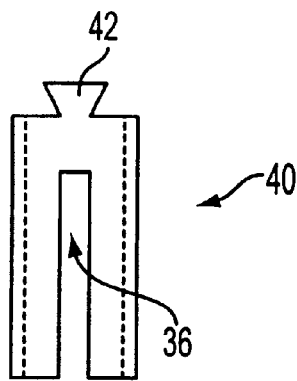
FIG. 2 is a top view of a wedge section of a stator core according to the present invention.
Figure 3:
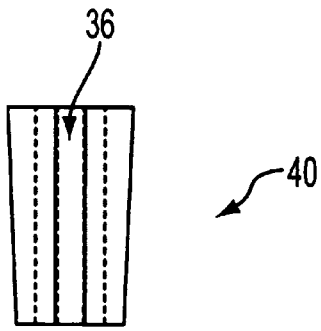
FIG. 3 is an elevation view of the wedge section illustrated in FIG. 2.

As illustrated in FIGS. 2 and 3, a third technique for manufacturing the annular stator core 30 involves approximating the torroidal form of the stator core using multiple identical wedge sections 40. FIG. 3 is an elevation view of a single wedge section 40 taken from the same point of view as the view of the entire stator core 30 in FIG. 1. FIG. 2 is a top view of the wedge section 40. Each wedge section 40 is comprised of many laminations stacked together to form a slot 36 and one half of each adjacent tooth. The stacks form a series of U-shaped pieces which define the wedge sections 40 and which can be combined to form the annular stator core 30.

As illustrated in FIG. 2, the wedge sections preferably include a mounting dovetail 42 (preferably, of triangular cross section) which can be fixed into a molded back support (not shown) or a backplate. The molded back support or backplate then maintains the spatial relationship between the individual wedge sections 40 to define the shape of the annular stator core 30.

Since the dovetails 42 extend radially outward and into the backplate, the entire stator can be constrained using a band at its perimeter, and this would be sufficient to position and secure the overall stator package.

There are several advantages achieved by the third technique. When the first two techniques are used, the benefits of using oriented material are not realized. Orientation in a wound core is in the direction of the wound strip of material. Since the illustrated stator 30 has the majority of the flux path in the axial direction through the teeth 38, the benefits of using oriented material cannot be realized because the direction of the strip winding is substantially perpendicular to the flux path.

The third technique, however, is not limited in this respect. To the contrary, the material used to make the laminated stacks according to the third technique can be oriented so that the orientation of the material matches the predominant flux path. It is therefore possible to produce a stator with significantly lower losses using the same total mass.

The third technique also may be used to create variations in the U-shaped configuration of the wedge sections 40. One such variation involves incrementally increasing the width of the "U" in successive laminations so that a smooth taper is achieved in the final wedge section 40. The resultant stator would have progressively more tooth mass with increasing radius.

An alternative approach would be to use identical pieces at all radii equal to what fits into the smallest radius of the stator 30. The resultant motor would have wedge-shaped gaps between each tooth half.

A third approach which can be taken in manufacturing the stator according to the third technique is to use a series of stepped sizes in the U-shaped lamination so that the gaps in the tooth centers form a series of triangular shapes. Extending this third approach with the aid of detailed modeling, waveform shaping and modification may be accomplished to compensate for edge effects and/or magnetic flux leakage.

The annular stator core 30 illustrated in FIG. 1 has a total of fifty-four slots 36 defining a total of fifty-four teeth 38. The fifty-four slots 36 and teeth 38 make the stator 10 particularly well-suited for use with a rotor having fifty-six equally spaced magnets facing the stator 10. Of course, the present invention is not limited to such an arrangement.

Generally, in a three-phase arrangement, the number of magnetic poles in the rotor would be even and not evenly divisible by three. The slot pitch in each arc section 14,16,18 of the stator core 30 is identical to the magnet pitch on the rotor, and the number of slots in each stator core 30 is divisible by three.

When the total number of slots 36 is an odd multiple of three (and therefore odd), the number of slots 36 and the number of magnetic poles in the rotor differ by one. However, when the total number of slots 36 is an even multiple of three (and therefore even), as illustrated in FIG. 1, the number of slots 36 and number of magnetic poles in the rotor differ by two.

Although FIG. 1 illustrates an arrangement wherein each arc section 14,16,18 belongs to a respective phase and no two arc sections 14,16,18 carry current of the same phase, it is understood that the present invention is not limited to such an arrangement. To the contrary, many of the foregoing advantages associated with the embodiment of FIG. 1 can be achieved by an arrangement having two or more arc sections per phase.

Figure 4:
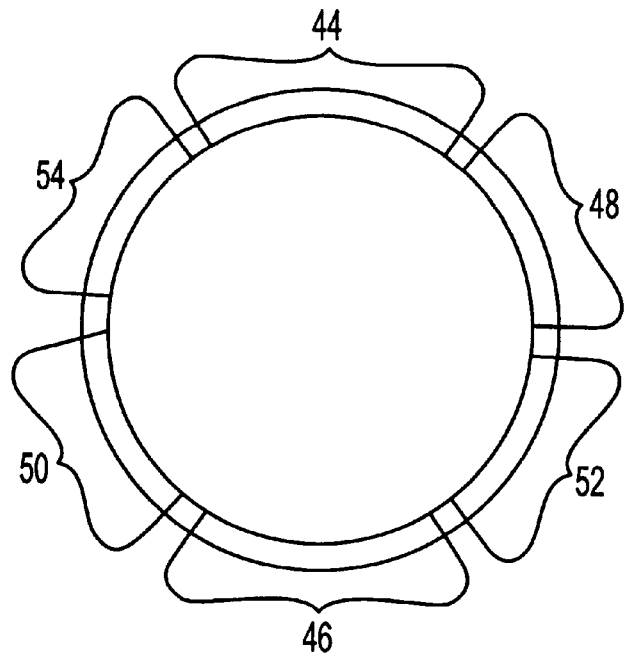
FIG. 4 schematically illustrates an arrangement of arc sections in a stator according to the present invention.

FIG. 4 schematically illustrates such an arrangement. In FIG. 4, a plurality of individual windings (not shown) in arc sections 44,46 carry current of the first phase only; arc sections 48,50 carry current of the second phase only; and arc sections 52,54 carry current of the third phase only. Since the plurality of windings in each arc segment 44,46,48,50,52,54 carry current of identical phase, most of the advantages described above with respect to the embodiment illustrated in FIG. 1 are achieved. The adjacent windings in each arc segment 44,46,48,50,52,54, for example, are interconnected without having to cross over windings associated with another phase. Additionally, the embodiment illustrated in FIG. 4 tends to reduce off-axis imbalance torques due to reluctance changes which rotate with the electrical frequency.

Although the embodiment illustrated in FIG. 4 requires different arc sections to be electrically connected to the same phase of current, this clearly is not as cumbersome as arrangements wherein all of the windings are adjacent to windings associated with different phases.

According to the present invention, the concepts illustrated by the embodiments of FIGS. 1 and 4 can be extended to three or more arc sections per phase, and can be implemented using the winding and core arrangements described in connection with FIG. 1 or any of the following alternatives thereto.

Figure 5:
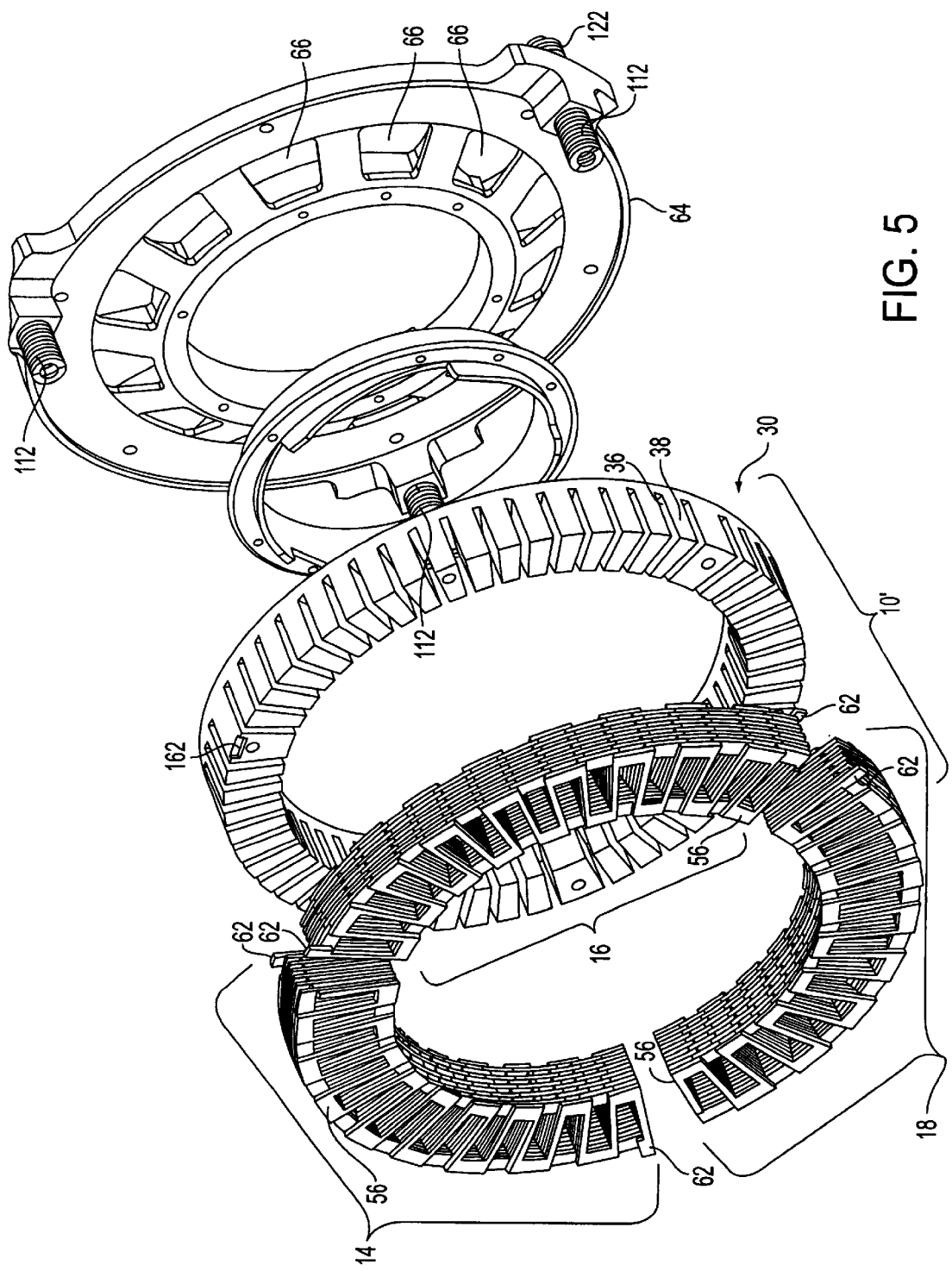
FIG. 5 is an exploded view of a stator in accordance with a second embodiment of the present invention.

FIG. 5 illustrates an alternative embodiment of the stator 10. The stator 10' illustrated in FIG. 5 includes the annular stator core 30 of FIG. 1. The windings of the stator 10', however, are defined by serpentine-shaped conductors 56 which fit between and around the teeth 38. Each serpentine-shaped conductor 56 is coextensive with a respective one of the arc segments 14,16,18. Since the illustrated teeth 38 have a generally rectilinear shape, the serpentine turns in each of the serpentine-shaped conductors 56 preferably are substantially orthogonal turns.

Figure 6:
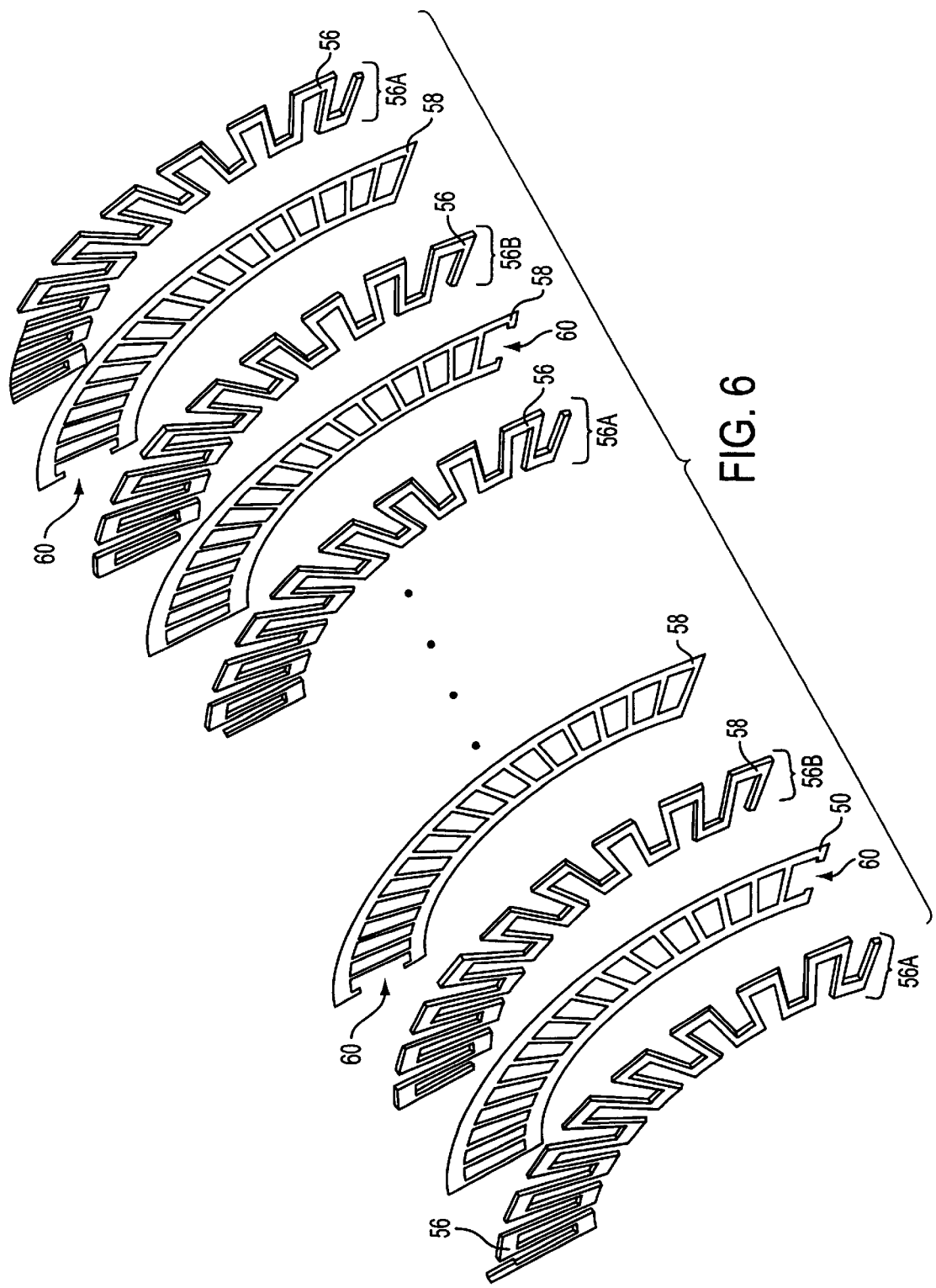
FIG. 6 is an exploded view of stator windings illustrated in FIG. 5.

As illustrated by the exploded view of FIG. 6, the serpentine-shaped conductors 56 in each arc segment 14,16,18 are stacked upon one another with an electrically insulative material 58 (such as MYLAR) disposed therebetween. Electrically insulative material preferably is also disposed in each slot 36 to electrically isolate the teeth 38 from the serpentine-shaped conductors 56.

Each arc segment 14,16,18 includes a stack of the serpentine-shaped conductors 58. Each stack includes (1) a first set 56A of substantially identical serpentine-shaped conductors 56 stacked alternatingly through the stack, and (2) a second set 56B of serpentine-shaped conductors 56 sandwiched between the serpentine-shaped conductors 56 of the first set 56A. The conductors 56 in the second set 56B of serpentine-shaped conductors 56 are substantially identical to one another but different from the first set 56A in that, when the first and second sets 56A and 56B are alternatingly stacked, portions of the serpentine-shaped conductors 56 in the first set 56A which are outside of the slots 36 extend around opposites sides of the teeth 38 from portions of the serpentine-shaped conductors 56 of the second set 56B which are also outside of the slots 36. This is perhaps best illustrated by the staggered conductor pattern which is visible in FIG. 5 along the radially inner surface and the radially outer circumferential surface of the stator 10'.

In order to define a conductive path through each conductor 56, the electrically insulative material 58 includes openings 60 through which adjacent ones of the serpentine-shaped conductors 56 in each stack are electrically connected. The openings 60 are arranged so that current flowing through each arc segment 14,16,18 flows end-to-end through each serpentine-shaped conductor 56 of that arc segment. In particular, the openings 60 are located at the longitudinal ends of the serpentine-shaped conductors 56, alternating from one end of each arc segment 14,16,18 to an opposite end of the same arc segment in successive layers of the electrically insulative material 60.

The serpentine-shaped conductors 56 are electrically connected at the openings 60 to immediately adjacent serpentine-shaped conductors 56 in the same stack, each serpentine-shaped conductor 56 being electrically connected to only one end of each adjacent serpentine-shaped conductor 56. The electrical interconnections preferably are achieved by soldering or any other connection technique which minimizes resistive losses.

In addition, the top and bottom conductors 56 in each stack include tabs 62 which facilitate connection of the windings defined by the conductors 56 to sources of electrical current.

When the serpentine-shaped conductors 56 are mounted to the annular stator core 30, there are longitudinally extending portions of the conductors 56 which lie outside of the slots 36 and transverse portions which lie within the slots 36.

The portions of the conductors 56 which lie outside of slots 36 are wider and therefore have a larger cross sectional area than the transverse portions of the serpentine-shaped conductors 56 which are located within the slots 36. By providing a larger cross sectional area outside of the slots 36, the resistive losses in that portion of each conductor advantageously are reduced. Although the illustrated embodiment increases the cross section by making the appropriate portions wider, it is understood that the thickness also may be increased to achieve even more reductions in resistive losses. In determining how much to increase the cross sectional area, the reduction in resistive losses should be balanced against the increase in weight.

Preferably, the teeth 38 extend axially beyond the stack of serpentine-shaped conductors 56 by a distance equal to half of the slot width. This reduces the eddy currents that otherwise are produced by magnetic flux lines from an adjacent rotor which are initially directed into the middle of a slot 36 and then bend toward one of the teeth 38 and intersect the conductors 56 before entering the sides of the tooth 38.

Each of the stators 10,10' of the present invention also may include a backplate 64 for supporting the stator. The backplate 64 is electrically isolated from the stator 10,10' by an insulative material (not shown) located between the backplate 64 and the stator 10,10'. In order to facilitate ventilation of the stator 10,10', the backplate 64 includes ventilation holes 66.

The stator of the present invention may be incorporated into an axial flux motor which is powered using at least two phases of electrical current. An exemplary motor which uses three phases of electrical current will now be described. It is understood, however, that the concepts being presented in connection with the illustrated three-phase motor are applicable to other motors using a number of phases which is not three.

Figure 7:
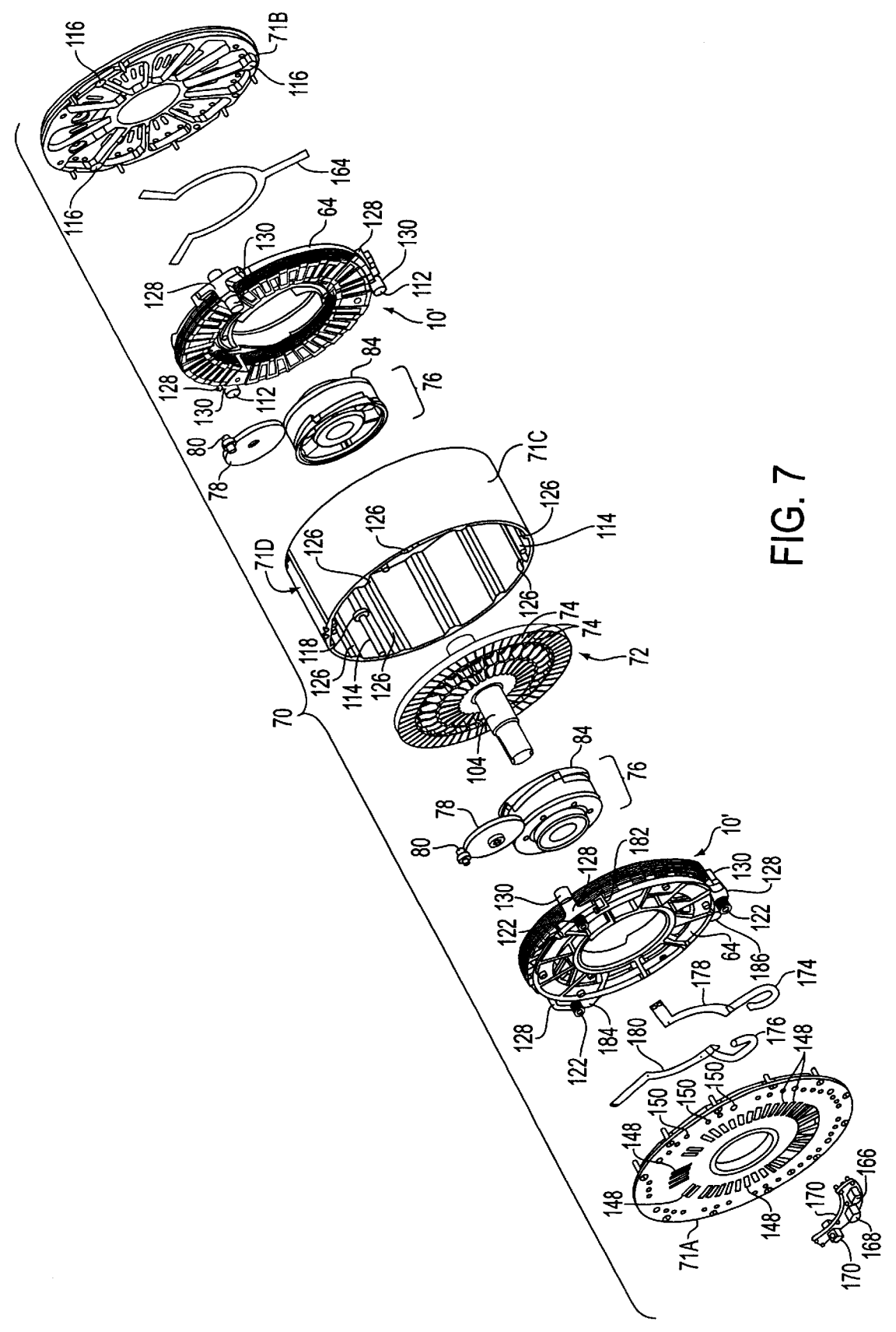

The three-phase motor 70 illustrated in FIG. 7 includes a rotor 72 having an outer circumference which carries magnetic field producing elements 74. The magnetic field producing elements 74 are arranged so as to produce a magnetic field that alternates in direction around the circumference of the rotor 70. Preferably, the magnetic field producing elements constitute permanent magnets which are bonded to appropriately shaped pockets in the rotor 72.

The motor 70 includes a motor housing defined by two end plates 71A,71B and a cylindrical housing member 71C. The cylindrical housing member 71C preferably includes a removable hatch 71D which facilitates access to the inside of the motor housing after assembly. The end plates 71A, 71B may include ventilation holes which are aligned with the ventilation holes 66 of a stator.

A first stator 10' identical to that which is illustrated in FIGS. 5 and 6 is arranged axially adjacent to the rotor 72. It is understood, however, that any of the stator structures described above may be used in place of stator 10'. A first air gap is defined by the space between the first stator 10' and the rotor 72.

Preferably, the stator 10' is selectively movable in an axial direction from the rotor 72 to vary the first air gap, and a mechanism 76 is provided for moving the stator 10' and thereby varying the first air gap.

Although an axial flux motor according to the present invention can operate using only one rotor 72 and one stator 10', the preferred arrangement, as illustrated in FIG. 7, includes two stators 101. The two stators 10' are located on opposite sides of the rotor 72 and constitute mirror images of one another. When the dual stator arrangement is used, the rotor 72 has appropriately shaped pockets on both sides of the rotor 72, and each side of the rotor 72 carries magnetic field producing elements 74. Alternatively, the magnetic field producing elements can extend through the rotor 72.

In the illustrated dual stator arrangement of FIG. 7, two mechanisms 76 are provided for moving respective stators 10' axially toward and away from the rotor 72. The air gaps between each stator 10' and the rotor therefore are varied by the two mechanisms 76. The present invention, of course, is not limited to the mechanisms 76 shown in the drawings. Other mechanisms, such as multiple cams or rack and pinion arrangements and screw mechanisms, can be implemented to achieve the desired variations in air gap.

The variable nature of the air gap in the illustrated motor provides significant advantages over motors which cannot vary the air gap(s) between their stator(s) and rotor(s). The variable air gap, for example, expands the range of motor speeds at which the motor is capable of producing torque.

In a conventional motor having a fixed air gap, low motor speeds produce high torque. As the motor speed increases, the back emf of the motor inhibits further torque production. Eventually, the conventional motor reaches a peak motor speed and cannot accelerate to higher speeds. Conventional drive systems in electric vehicles therefore utilize either a combination of a motor and gears which couple the motor to drive wheels using a selectively variable gearing ratio, or a significantly bulkier and heavier motor capable of producing more torque and therefore capable of producing torque over a wider range of motor speeds.

The present invention avoids the shortcomings in conventional arrangements by increasing the air gap at higher motor speeds. The increased air gap reduces the back emf, thereby permitting the motor to generate torque at higher speeds.

In an electric vehicle using more than one motor, each motor being assigned to drive a respective wheel of the vehicle, the ability to vary the air gap provides even more advantages. A preferred manner of propelling such an electric vehicle, according to the present invention, is to accelerate the vehicle from a stopped position using the minimum air gaps for each motor (i.e., maximum torque). The maximum torque produced by the motors in the minimum air gap configuration is sufficient to accelerate the vehicle. The minimum air gap is maintained until the back emf of the motor rises sufficiently to prevent further increases in the motor's speed. The air gap in each motor then is progressively increased until the vehicle reaches a desired speed. Once the desired speed is reached, the air gap for that particular speed is maintained so that the vehicle continues to run at the equilibrium point where the back emf prevents further acceleration.

The vehicle's speed, therefore, is controlled by varying the air gap in all of the motors. By keeping the motors at the equilibrium point, slippage in one wheel produces no additional torque. A slipping wheel therefore does not accelerate further. Likewise, a wheel that is loaded down more than another wheel, initially slows down. There is consequently a reduction in the back emf of the windings associated with that wheel and additional torque is provided until that wheel returns to the desired speed.

The foregoing technique for controlling the vehicle's speed using the air gap also has advantages associated with regenerative braking. During regenerative braking, the air gap is progressively closed and the back emf is used to apply power to the power bus of the vehicle. If one of the wheels exhibits excessive braking action and starts to lock up (or skid) during regenerative braking, the back emf associated with that wheel is automatically reduced by the reduction in motor speed for that particlar wheel. The braking action in that wheel consequently is reduced to prevent skidding.

The ability to control vehicle speed by varying the air gap according to the present invention thus provides significant advantages over arrangements using a constant air gap in each motor.

Preferably, the motor controller of the present invention is programmed to control the motor(s) so that the motor(s) stays at the equilibrium point described above. In this regard, the mechanisms 76 can be provided with actuators that are controlled by the motor controller based on signals indicative of whether the motor is operating at the equilibrium point. Such actuators can provide actuation of the mechanisms 76 in response to control signals from the motor controller.

Although the air gaps can be varied independently, a coupling mechanism preferably couples the first and second mechanisms 76 so that variations in one air gap produce identical variations in the other air gap. The coupling mechanism includes, among other things, two small gears 78 and two pinion gears 80. The movement produced by each mechanism 76 is referenced from the rotor 72 to avoid errors that might otherwise occur if the stator movements were referenced only to the relative distance between the stators.

As illustrated in FIG. 8, the coupling mechanism further includes a pinion rod 82 to which the pinion gears 80 are fixedly attached. A camming hub 84 of each air gap varying mechanism 76 has circumferential gear teeth 86. The circumferential gear teeth 86 mesh with the gears 78 which, in turn, mesh with the pinion gears 80. Rotation of one camming hub 84 therefore causes the other camming hub 84 to also rotate.

Preferably, the combination of the pinion rod 82 and pinion gears 80 is contained immediately under the hatch 71D of the cylindrical housing member 71C. This way, the pinion rod 82 and pinion gear 80 combination can be accesses easily and removed temporarily to permit uncoupling of the camming hubs 84 and permit relative rotation of the camming hubs 84 until a desired relative orientation is achieved. After the desired orientation is achieved, the pinion rod 82 and pinion gear 80 combination is replaced to again couple the camming hubs 84.

The camming hubs 84 include camming elements 88 arranged around a circumferential surface of the camming hubs 84. Each camming element 88 has a wedge-like shape. A matching set of stator camming elements 90 are carried by a camming ring 92 which is rigidly secured to the backplate 64 of each stator 10'. The camming ring 92 circumferentially surrounds a ring-facing surface 94 of the respective camming hub 84.

FIG. 9 is a perspective view of the camming hub 84. A cross sectional view of the same camming hub 84 is provided by FIG. 10.

Figure 12:
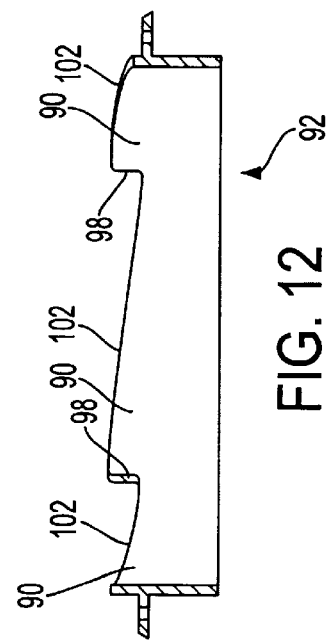
FIG. 12 is a cross sectional view of the stator camming ring illustrated in FIG. 11.
Figure 11:
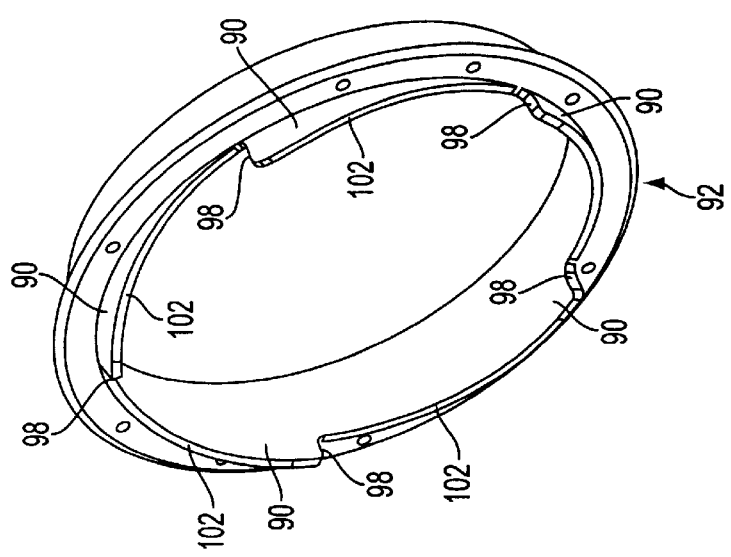
FIG. 11 is a perspective view of a stator camming ring according to the present invention.

FIG. 11 is a perspective view of the camming ring 92. A cross sectional view of the same camming ring 92 is provided by FIG. 12.

The camming hub 84 is rotatable with respect to the rotationally stationary camming ring 92. When the camming hub 84 is rotated so that the short edges 96 of the camming elements 88 engage corresponding short edges 98 of the stator camming elements 90, the minimum air gap of the motor is achieved (preferably about 1 millimeter). As the camming hub 84 rotates away from this orientation, the long edges 100 of the camming elements 88 bear against the long edges 102 of the stator camming elements 90 and cause the camming ring 92 to move axially away from the rotor 72.

This, in turn, causes the stator 10' to move away from the rotor 72. Rotation of the camming hub 84 in an opposite direction permits the stator 10' to move closer to the rotor 72.

As illustrated in FIG. 7, the motor 70 includes a motor output shaft 104. The motor output shaft 104 is rigidly connected to the rotor 72 for rotation therewith, and is circumferentially surrounded by the camming hubs 84. Between each camming hub 84 and the motor output shaft 104, there is an angular thrust bearing (not shown) which sits in a primary bearing pocket 106 of each camming hub 84. The thrust bearing bears directly against the rotor or a shoulder on the output shaft 104. The camming hub's axial position therefore remains reliably fixed with respect to the rotor 72.

Alternatively, a simple roller bearing can be positioned in the primary bearing pocket 106 and a simple thrust bearing can be located in a secondary bearing pocket 108 of the camming hub 84.

Regardless of which bearing arrangement is implemented, the "thrust" aspect of the bearing arrangement allows the camming hub 84 to be axially fixed in position with respect to the rotating rotor. The location of the camming elements 88 in the axial direction therefore remains referenced from the rotor 72.

As illustrated in FIG. 9, notches may be located in the axially outer sides of the camming hubs 84 to facilitate external rotation of the camming hubs 84. In an electric vehicle context, the notches 110 may be connected to speed shifting linkage analogous to a gear shifting lever in a vehicle. Instead of shifting gears, however, the speed shifting linkage would vary the air gaps between the stators and the rotor and thereby permit higher torque-generating motor speeds.

The illustrated combination of camming hubs 84 and camming rings 92, for varying the air gaps, is effective at pushing the stators 10' away from the rotor 72 when the camming hubs 84 are rotated in a first direction. Likewise, when the camming hubs 84 are rotated in an opposite direction and the air gap is relatively small, the magnetic attraction between the rotor 72 and stators 10' permits mere rotation of the camming hubs 84 to cause a reduction in the air gaps. At larger air gaps, however, the attraction may not be strong enough to draw the stators toward the rotor 72. This is so because the magnetic attraction between the stators 10' and the rotor 72 decreases exponentially as the air gap is increased.

Therefore, a biasing element is required in order to urge the stators 10' toward the rotor. When the air gap is small, however, the forces provided by such biasing elements, combined with the attractive forces between the stators 10' and rotors 72 may impart excessive wear on the thrust bearings. It would be better to provide an arrangement wherein a small amount of axial force is applied by the camming hubs 84 against the thrust bearing, regardless of the size of the existing air gap.

The optimal arrangement therefore would be a biasing element which provides a counter-active force against stator-to-rotor attraction, wherein the counter-active force increases as the stators approach the rotor, as well as a force which positively loads the stators toward the rotor so that the camming elements 88 remain in contact with the stator camming elements 90. The positively loading force, of course, should not reach levels which would result in excessive wear of the thrust bearing.

The mechanisms 76 for varying the air gap therefore include at least one resilient member arranged so as to urge the respective stator 10' away from the rotor 72 with a counter-active force which counteracts an attractive force between the stator 10' and the rotor 72. The resilient member is arranged so that the counter-active force increases as the stator 10' approaches a position associated with a minimum air gap. Preferably, this increase is exponential and matches the characteristics of the stator-to-rotor attractive force.

Such characteristics can be designed into a specially manufactured spring. Alternatively, such characteristics can be achieved using an appropriately dimensioned polyurethane cylinder or the like which responds to compression in a manner which matches the stator-to-rotor attractive force. According to yet another alternative, the combination of a polyurethane cylinder and a conventional spring may be used.

Another resilient member is provided for positively loading the stators 10' toward the rotor 72. This particular resilient element can be achieved using a conventional spring or the like. The camming elements 88 therefore remain in contact with stator camming elements 90.

Figure 13:
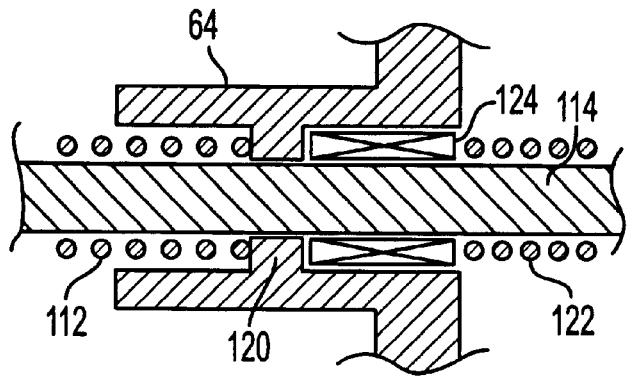
FIG. 13 is a cross sectional view of a tab in a stator backplate according to the present invention.

With reference to FIGS. 5 and 7, the resilient member which matches the characteristics of the stator-to-rotor attractive force is achieved using three appropriately manufactured springs 112 for each backplate 64. Thus, the illustrated motor includes three pairs of springs 112. Each pair of springs 112 circumferentially surrounds a respective stabilizing rod 114 which extends from an appropriate receptacle 116 in an end plate 71A through the backplates 64 of the stators 10' and into the opposite end plate 71B. Each stabilizing rod 114 is circumferentially surrounded by a radially outwardly extending flange 118. One end of each spring 112 bears against the flange 118. As illustrated in FIG. 13, an opposite end of each spring bears against an internal flange 120 of the backplate 64.

The resilient member which provides positive loading of the stators 10' toward the rotor 72 is achieved using three springs 122 for each stator 10'. The springs 122 are located between the backplate 64 of a corresponding stator 10' and a corresponding one of the end plates 71A,71B. The springs 122 urge the backplates 64 toward the rotor 72. The urging force provided by the springs 122, however, is counter-acted by the springs 112 so that the total force pushing the backplates 64 toward the rotor 72 (balanced by the stator-to-rotor attractive force) is just enough to urge the backplates 64 toward the rotor 72 without pushing excessively on the thrust bearing, regardless of the axial position of the backplates 64 with respect to the rotor 72.

As illustrated in FIG. 13, a linear bearing 124 is mounted to each backplate 64 at each position on the backplate 64 which receives a stabilizing rod 114. The linear bearings 124 advantageously reduce the amount of friction between the backplates 64 and the stabilizing rods 114 during axial movement of the backplates 64 along the stabilizing rods 114.

The stabilizing rods 114 guide the axial movement of the stators 10' and also prevent rotation of the stators 10' with respect to the end plates 71A,71B. In addition, as illustrated in FIG. 7, the cylindrical housing member 71C may include ridges 126 where bolts are received when mounting the end plates 71A,71B to the cylindrical housing member 71C. These ridges 126 can be arranged so as to engage radially outwardly projecting tabs 128 of the backplates 64. This, in turn, provides additional resistance to stator rotation.

As illustrated in FIG. 7, spacer sleeves 130 may be disposed around the springs 112. The spacer sleeves 130 provide an alternative or additional way of establishing a minimum air gap between the rotor 72 and the stators 10'. The length of the spacer sleeves 130 defines the minimum air gap. In particular, the spacer sleeves 130 have a length which matches the distance between the radially outwardly projecting flange 118 and the backplates 64, when the air gap is at the desired minimum. The spacer sleeves thereby preclude movement of the backplates any closer to the rotor 72 than the desired minimum air gap.

Figure 14:
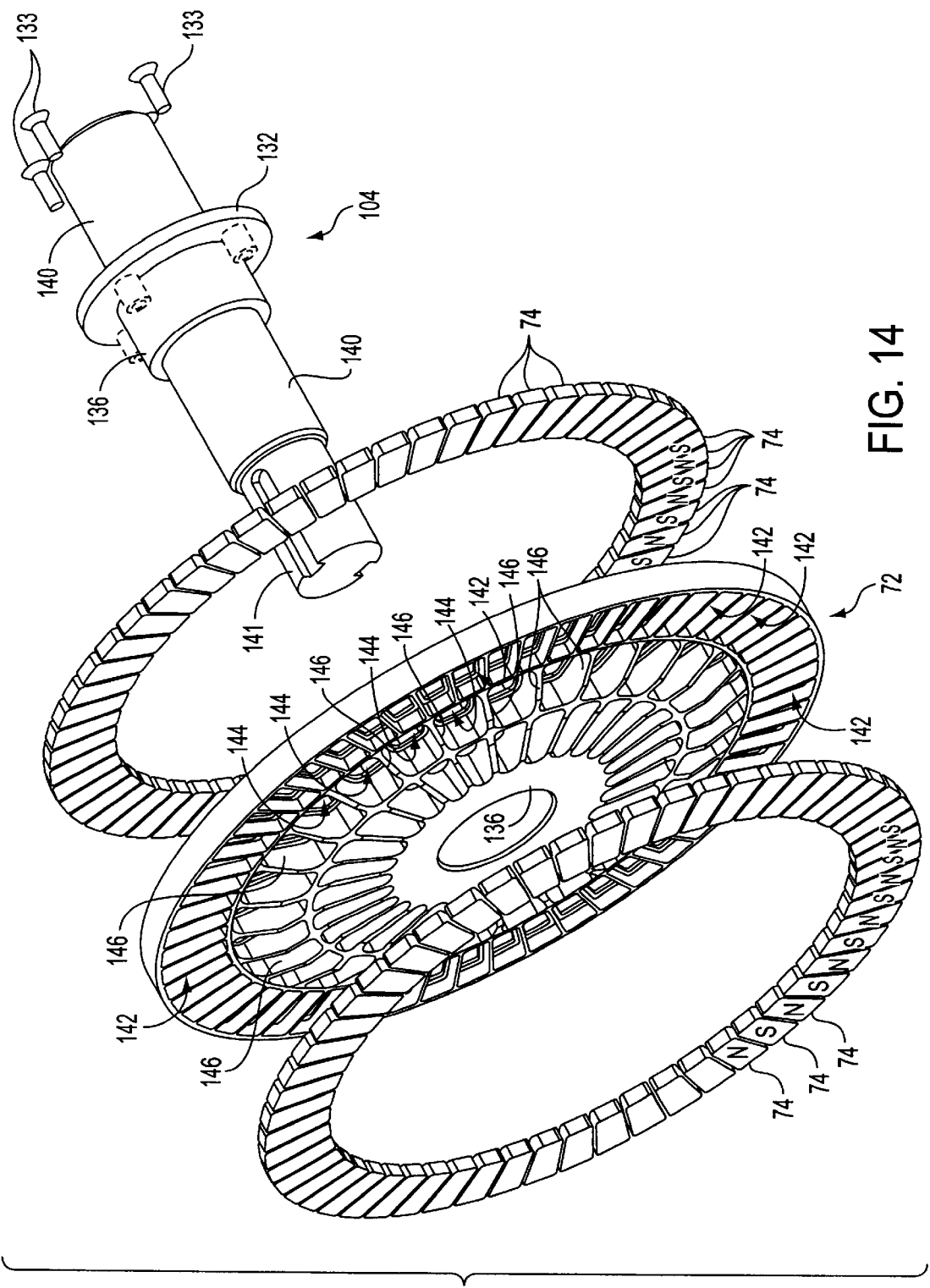
FIG. 14 is an exploded view of a rotor according to the present invention, and a motor output shaft associated therewith.

FIG. 14 is an exploded view of the rotor 72 and the motor output shaft 104 to which the rotor 72 is secured. In particular, the rotor 72 is secured to a radially outwardly projecting flange 132 of the motor output shaft 104 using appropriate fasteners 133. The radially inner edge 134 of the rotor 72 rides on a rotor carrying surface 136 of the motor output shaft 104. The motor output shaft 104 further includes shoulders 138 (one of which is not visible in FIG. 14 because it is obstructed from view by the radially outwardly projecting flange 132).

The radially extending walls of the shoulders 138 bear against the angular thrust bearings of the camming hubs 84, and thereby positively reference the camming hubs 84 with respect to the rotor 72. The camming hubs 84 via the appropriate bearing(s) (e.g., angular thrust bearings or a combination of thrust bearings and roller bearings) ride on hub carrying surfaces 140 of the motor output shaft 104. Preferably, the motor output shaft 104 is keyed at a coupling end 141 to facilitate coupling of the motor output shaft 104 to a mechanism which is to be driven by the motor (e.g. the wheel of a vehicle or a drive shaft or axle associated therewith).

In the embodiment illustrated in FIG. 14, permanent magnets 74 function as the magnetic field producing elements of the rotor 72. The permanent magnets 74 are securely bonded to appropriately shaped pockets 142 in the rotor 72. The orientation of the magnets alternates along the circumference of the rotor 72 such that the magnetic field on each side of the rotor 72 alternates between north (N) and south (S) poles.

Preferably, the rotor 72 also includes ventilation holes 144 located radially in from the pockets 142. The ventilation holes 144 operate in conjunction with fins 146 in the rotor 72 to propel air through the stators 10' from ventilation holes 148 in one of the end plates 71A,71B which are aligned with the ventilation holes 66 in the backplates 64. After flowing through the stators 10', the propelled air exits from additional ventilation holes 150 located radially outside of ventilation holes 148, or alternatively, exits through ventilation holes (not shown) in the cylindrical housing member 71C. The propelled air helps to cool the stator windings and thereby improves efficiency.

FIGS. 15 and 16 are perspective views of opposite sides of a preferred backplate 64. FIG. 17 is a cross section of the same backplate 64. In FIG. 16, a recessed portion 152 of the backplate 64 is visible. The recessed portion 152 has dimensions sufficiently large to accommodate either one of the gears 78. Thus, backplate 64 can be located on either side of the rotor 72, making the manufacturing of two different backplate configurations unnecessary. With reference to FIG. 7, for example, the backplate 64 attached to the stator 10' in the upper right corner of the drawing, has its respective gear 78 projecting out through the slot 154 of the recessed portion 152 shown in FIG. 16 to engage the respective pinion gear 80. By contrast, the backplate 64 attached to the stator 10' in the lower left corner of the FIG. 7 drawing, has its respective gear 78 projecting out through the slot 156 of the recessed portion 152 to engage its respective pinion gear 80.

Although the exploded view of FIG. 7 shows the gears 78 and pinion gears 80 between the rotor 72 and the stator 10', it is understood that the gears 78 and pinion gears 80 actually are located between a respective backplate 64 and a respective end plate 71A,71B. The position of the gears 78 and pinion gears 80 in FIG. 7 merely illustrates the meshing which occurs between the gear teeth 86 of the camming hubs 84 and the gears 78, and is not intended to convey information regarding the axial position of the gears 78 and pinion gears 80.

Figure 17A:
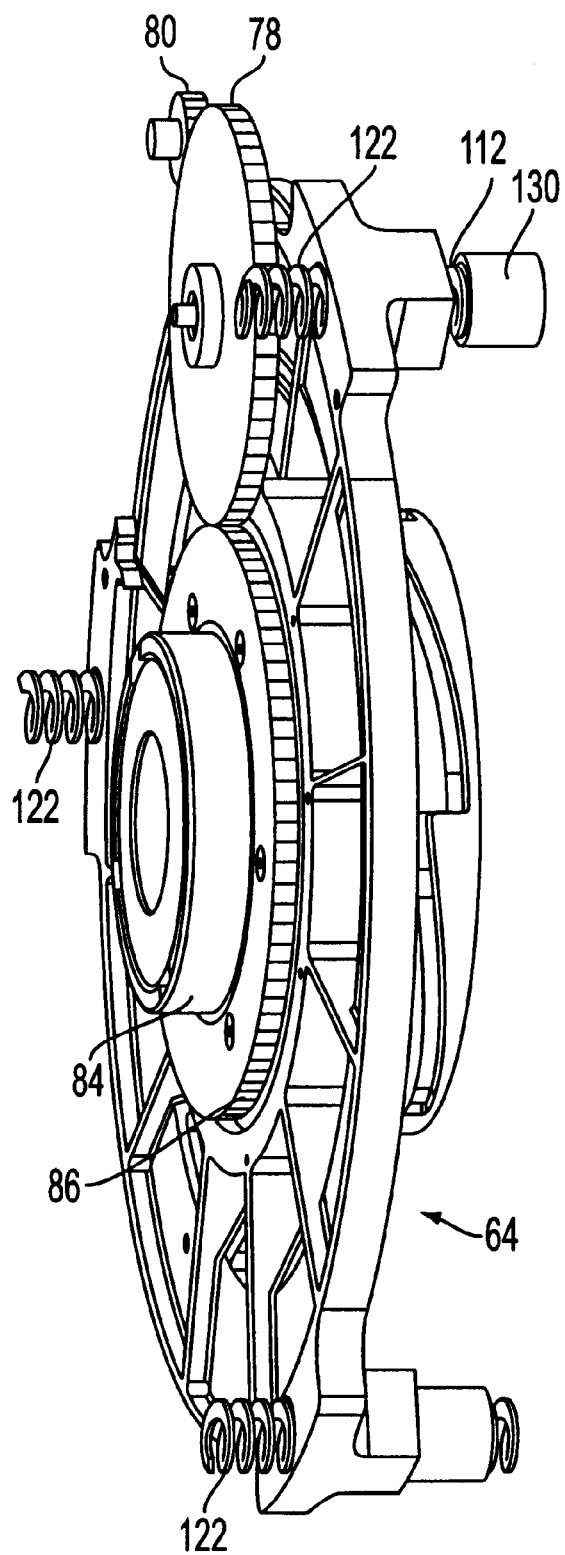
FIG. 17A is a perspective view of the stator backplate of FIGS. 15 and 16, along with a camming hub and coupling mechanism, according to the present invention.

FIG. 17A, however, does show the positional relationship between one of the camming hubs 84, its respective gear 78 and the pinion gear 80, when these elements are assembled.

FIG. 18 is an elevation view of the rotor 72 without the magnets 74. FIG. 19 is a cross sectional view of the same rotor 72. In FIG. 19, a web 153 separates the pockets 142 which are located on opposite sides of the rotor 72. Preferably, the magnets 74 located on opposite sides of the web 153 are arranged so that their opposite poles are directed toward one another. By arranging the magnets 74 in this manner, the attraction force between the magnets 74 tends to retain the magnets 74 within the pockets 142. In addition, an adhesive, such as resilient cyanoacrylate adhesive (Loctite Black Max Gel) is used in the pockets to couple the shear forces exerted on the magnets 74 to the rotor 72. This advantageously secures the magnets 74 to the rotor 72 in a reliable manner without requiring separate fasteners.

FIG. 20 is an elevation view of a preferred end plate 155 which can serve as either one of end plates 71A,71B. FIGS. 20A and 20B are cross sectional views of the same end plate 155. Depending on which end plate 71A,71B is being satisfied, one of the gear axis receptacles 158 secures the gear 78 in place and one of the pinion rod holes 160 receives the pinion rod 82. Although the end plates 71A,71B can be manufactured to have different configurations, the illustrated interchangeable end plate 155 is preferred because of its versatility and reduction in manufacturing costs.

With reference to FIG. 5, the stator cores 30 may include a notch 162 capable of accommodating a Hall effect sensor or the like for the purpose of detecting the rotor's rotational position, or position and speed.

Each stack of serpentine conductors 56 may be secured to the stator core 30 using any conventionally known technique. Potting techniques, for example, can be used to secure the conductors 56 in place using a resin.

The windings of the motor preferably are connected in a wye configuration. A wye conductor 164, as illustrated in FIG. 7, therefore is electrically connected to a ground terminal of the motor and also to each of three tabs 62 (illustrated in FIG. 5) on the backplate side of the three arc sections 14,16,18 of the stator 10' in the upper right corner of FIG. 7. The three tabs 62 on the rotor side of the same stator 10' are connected to the corresponding three tabs 62, respectively, on the other stator 10' (the stator in the lower left corner of FIG. 7). Three flexible conductors (not shown) are used to achieve these inter-stator connections of the rotor-side tabs 62.

The tabs 62 on the backplate side of the stator 10' shown in the lower left corner of FIG. 7 are electrically connected to respective current input terminals 166,168,170 of a terminal block 172. This interconnection between two of the terminals 166,170 and their respective tabs 62 on the backplate side of the stator 10' preferably is achieved using the combination of flexible conductors 174,176, arc-shaped conductors 178,180 and U-shaped conductors 182,184. The remaining tab 62 is connected via a third U-shaped conductor 186 to a flexible conductor (not shown) which, in turn, is connected to the terminal 168 of the terminal block 172.

In the above preferred arrangement, the flexible conductors are used to compensate for movement of the stator during air gap variations.

The illustrated motor is particularly well-suited for use in an electric vehicle. The motor has significantly improved torque-producing range compared to other motors of equal size which cannot vary their air gaps. This broad range of torque producing speeds eliminates the need for heavy gearing arrangements capable of providing multiple gear ratios. The motor itself therefore can be connected directly to an axle of the vehicle's wheel. Since the motor alone is significantly lighter and smaller than the combination of a transmission and motor, the motor of the present invention makes it more feasible to provide a motor at each wheel of the vehicle, thereby creating a four-wheel drive vehicle with independently driven wheels.

Figure 21:
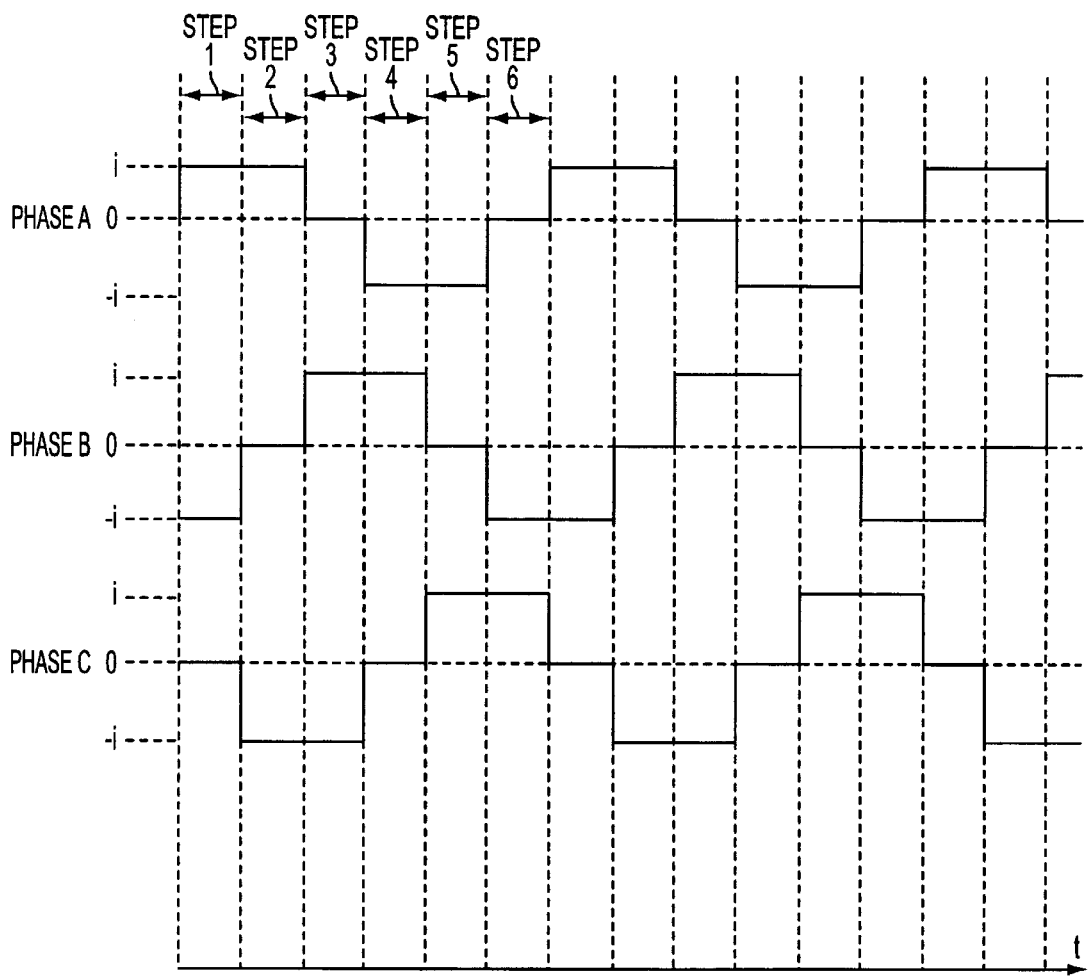
FIG. 21 is a timing diagram illustrating current pulsed according to the present invention.

The preferred motor illustrated in FIGS. 7–20B can be powered and controlled using a conventional controller which supplies pulses of electrical current through the respective windings associated with phases A, B and C as shown in FIG. 21. In FIG. 21, the vertical broken lines represent boundaries of commutation steps 1–6 which are sequentially repeated during application of the illustrated pulses.

When more torque is desired, the controller increases the amplitude of the currents i and –i in each of the phases. Controllers of this type are generally known.

Typically, the controller includes a programmable microcontroller, capacitors for holding a desired voltage of a power supply and filtering out switching noise, and a switching circuit for switching the desired voltage on and off through the windings to create the pulses of current shown in FIG. 21 and for directing the pulses into the appropriate windings. When the desired magnitude of current is high, the switches which cycle the voltage stay on longer than they are off. Conversely, when a smaller magnitude of current is desired in each pulse, the controller keeps the voltage cycling switches on for a shorter period of time than they are off.

Figure 22:
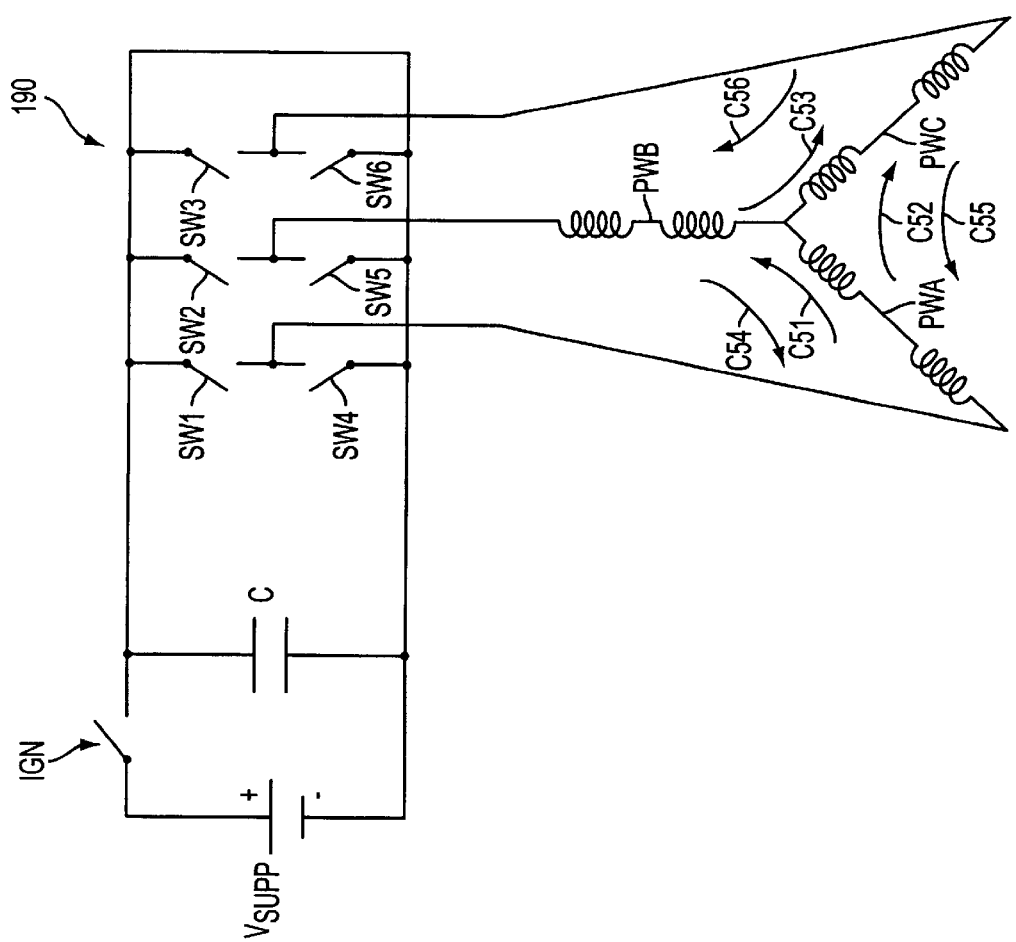
FIG. 22 illustrates a switching network according to a preferred embodiment of the present invention.

The typical switching network 190 is shown schematically in FIG. 22. The D.C. power supply $V_{supp}$ and capacitance C also are shown in the illustrated switching network 190. Also, shown are the windings PWA, PWB, PWC for phases A, B and C. The windings PWA, for example, may correspond to the windings in the arc sections 14 of the stators 10' in accordance with the present invention. The windings PWB and PWC, likewise, may represent the windings in the arc sections 16,18, respectively, of the stators 10'.

The switches which control the duration of the ON and OFF periods of the voltage are switches SW1, SW2 and SW3. One of these switches is turned ON and OFF several times during each commutation step. The particular one of the switches SW1, SW2 and SW3 which is cycled ON and OFF depends on which commutation step is present. During the first commutation step, for example, switch SW1 is cycled on and off at a frequency which creates the desired current level i in the windings PWA and which creates the desired reversed current flow –i in the windings PWB, while the switch SW5 remains on during the entire first commutation step.

During the second commutation step, switch SW1 continues to be cycled on and off at a frequency which creates the desired current level i in the windings PWA, but now the switch SW6 is closed for the entire second commutation step. This, in turn, creates the desired reversed current flow −i in the windings PWC.

Next, during the third commutation step, switch SW2 is cycled on and off at a frequency which creates the desired current level i in the windings PWB and the switch SW6 remains on for the entire third commutation step, thereby continuing the desired reversed current flow −i in the windings PWC.

This switching process continues through the commutation steps 1–6 and is repeated under the control of the programmable microcontroller. The direction of current flow during commutation steps 1–6 is shown in FIG. 22 using respective arrows CS1–CS6.

Preferably, the switches SW1–SW6 are implemented using FETs (field effect transistors) or, alternatively, using IGBTs having respective diodes connected across their output terminals.

Figure 23:
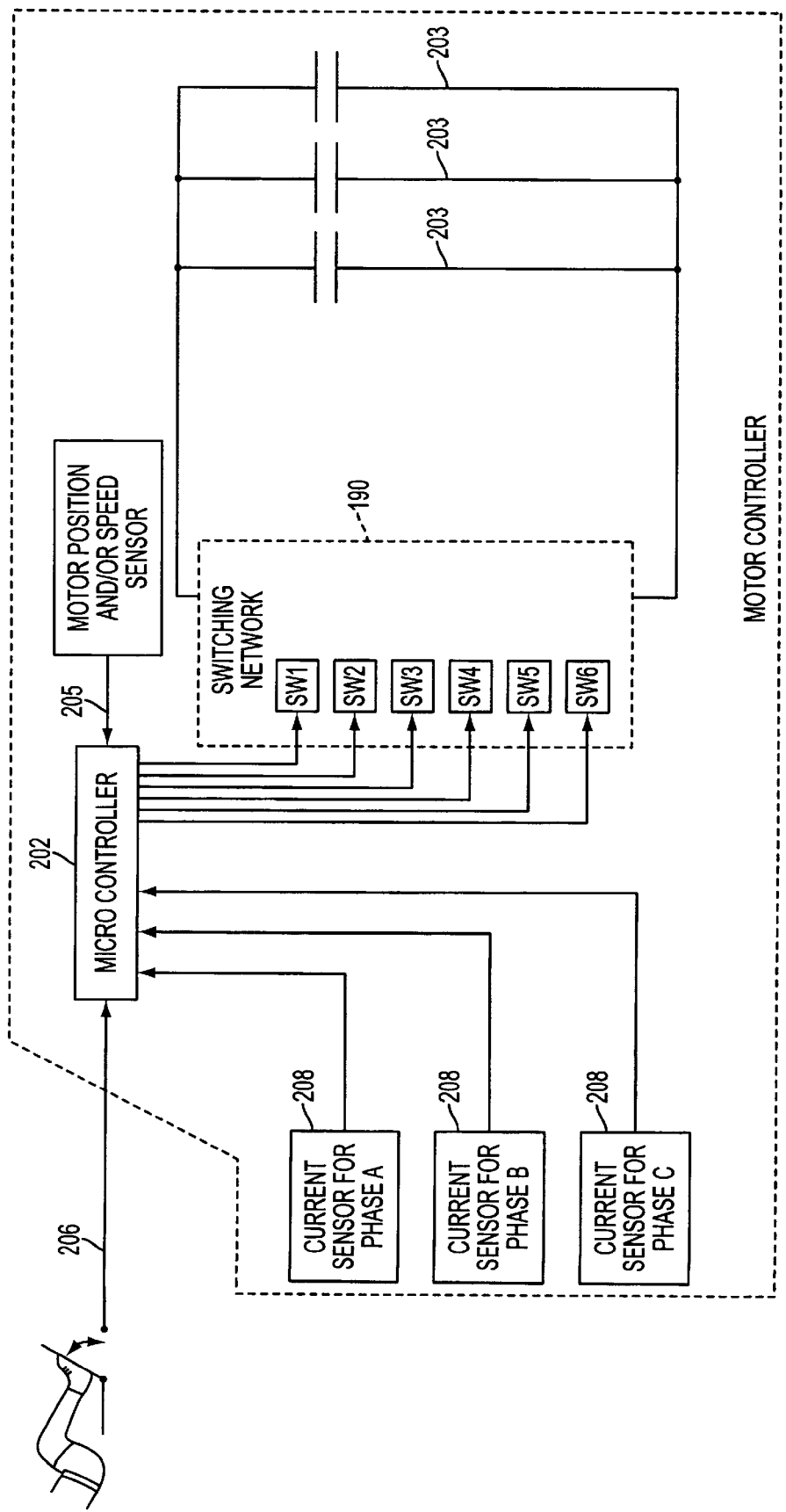
FIG. 23 is a block diagram of a conventional motor controller which can be arranged to operate in a non-conventional manner according to the present invention.

FIG. 23 is a block diagram of the conventional controller. Although the controller actually comprises many other individual components, such components are conventional and the details thereof consequently will not be described.

Generally, the controller 200 includes a programmable microcontroller 202, the capacitors 204 for holding a desired voltage of a power supply $V_{supp}$ and for filtering out switching noise, and the switching circuit 190. The microcontroller 202 may be responsive to a signal 205 indicative of motor position and/or speed, for example, from a Hall effect sensor mounted to one or both of the stators 10'.

The microcontroller 202 also is responsive to a signal 206 indicative of a desired amount of torque, for example, from an accelerator pedal, and responds to this signal 206 by setting a desired value of current magnitude through the windings.

Based on this desired value of current magnitude and/or the motor's speed, the microcontroller 202 selects an appropriate duty cycle for the switches SW1, SW2 and SW3 and sequentially actuates the switches SW1, SW2 and SW3 using that duty cycle. The resulting current is detected by the microcontroller 202 using three current sensors 208 (one for each phase of windings), and the duty cycle is adjusted to maintain the desired current magnitude. Such switching, however, creates undesirable switching losses.

To a void such switching losses to some extent, a hysteresis-based controller has been developed, wherein the microcontroller, based on the magnitude of current desired, sets an upper predetermined value of current magnitude and a lower predetermined value of current magnitude. The desired magnitude of current (i in the drawings) lies in the middle of the upper and lower predetermined values.

The microcontroller 202 is programmed to turn on the appropriate one of switches SW1, SW2 and SW3 and to keep that switch on until the magnitude of current according to one of the sensors 208 reaches the upper predetermined value. When the upper predetermined value is reached, the switch SW1, SW2 or SW3 is turned off.

Th e microcontroller 202 then continues to monitor the current levels via sensors 208. Because of a hysteresis effect, the current will continue to flow at progressively decreasing levels for some time before dropping to the lower predetermined value. When the lower predetermined value is achieved, the microcontroller again actuates the appropriate one of switches SW1, SW2 and SW3 to again apply a voltage. This process of switching the current between the upper and lower predetermined values is repeated for the entire commutation step. A similar process is carried out during each subsequent commutation step, in some cases using a different one of the switches SW1, SW2 and SW3. Thus, the microcontroller 202 takes advantage of the hysteresis effect to provide a slower switching frequency, while keeping the magnitude of current within the range of magnitudes determined by the upper and lower predetermined values.

This approximation of the desired current advantageously reduces the switching losses when the desired intermediate value of current magnitude (between the upper and lower predetermined values) is close to zero or close to the maximum current value. At those two extremes, the hysteresis effect significantly slows the switching times.

However, because the bandwidth or spread between the first and second predetermined value is fixed, the switching frequencies tend to be higher and the benefits of the hysteresis control are significantly reduced when current magnitudes in the middle range are desired.

Therefore, according to another aspect of the present invention, the hysteresis control is carried out in an active manner. That is, the microcontroller 202 is programmed to modify the spread (or bandwidth) between the upper and lower predetermined values in a manner dependent, for example, on the signal 206.

According to the present invention, therefore, the motor controller 200 includes switching elements (e.g., switches SW1–SW6) for connection electrically between a D.C. power supply $V_{supp}$ and windings associated with respective phases of the motor; current detection lines (e.g., from current sensors 208) which carry signals indicative of current flowing through respective ones of the windings; and a control unit (e.g. microcontroller 202) which is responsive to the current detection lines, for controlling each switching element to initially close at the beginning of a respective commutation step, then to open when current through a respective one of the windings achieves a first predetermined value and to close again when the current through the respective one of the windings drops below a second predetermined value. The first and second predetermined values define a hysteresis bandwidth therebetween and are determined by the microcontroller based on an intermediate value of current desired for the present commutation step of the motor.

The control unit (or microcontroller), however, is programmed or otherwise arranged to selectively vary the hysteresis bandwidth in a manner which, for example, maximizes efficiency. The variation in hysteresis bandwidth and/or the particular values of the upper and lower predetermined values which provide the variations in hysteresis bandwidth, may be obtained by the microcontroller using a table look-up routine which accesses a table of values in a memory unit. The memory unit may be part of the microcontroller, or alternatively, may be implemented using a separate memory chip.

According to one aspect of the motor controller, the hysteresis bandwidth is selectively varied in a manner dependent upon the intermediate value of current and/or motor speed.

According to another aspect of the motor controller, the hysteresis bandwidth is selectively varied in a manner which minimizes the sum of switching power losses associated with the switching elements and resistive power losses associated with winding resistance.

Since certain switching frequencies may result in undesirable and/or audible noise, the control unit (or microcontroller) of the motor controller may be programmed so as to selectively vary the hysteresis bandwidth so that audible and/or undesirable noise is reduced. Switching frequencies between 800 Hertz and 1,000 Hertz, for example, can be selectively avoided.

According to yet another aspect of the motor controller, the control unit (or microcontroller) is responsive to an amount of torque desired and is arranged so as to set the first and second predetermined values accordingly.

Preferably, the individual components which define the motor controller are arranged so that additional power can be accommodated by merely adding parallel-connected capacitors and switches (e.g., FETs) and by extending legs of a circuit board to accommodate the additional capacitors and switches. The circuit board elements that drive the switches are merely replicated on the extended legs of the circuit board.

Figure 24:
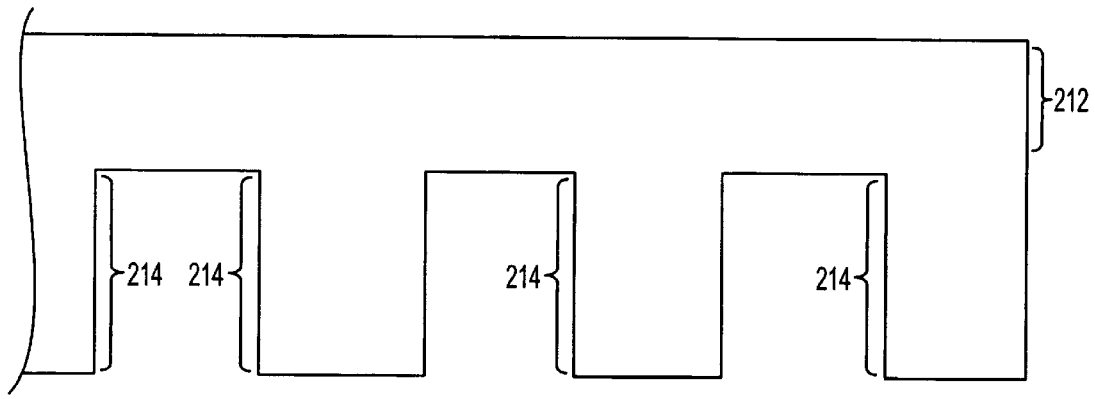
FIGS. 24 and 25 illustrate a modular circuit board arrangement in accordance with a preferred embodiment of the present invention.

With reference to FIG. 24, a control unit circuit board 210 has a main body 212 and legs 214. The main body 212 carries circuit components which are essential to all controllers regardless of the amount of current to be used. The legs 214, by contrast, carry the circuit components which are necessary to drive each switch and provide appropriate filtering therefor. The switching elements (e.g., FETs or IGBTs), capacitors, and current carrying bus, for each phase, may be provided in a space between each pair of legs 214.

Figure 25:
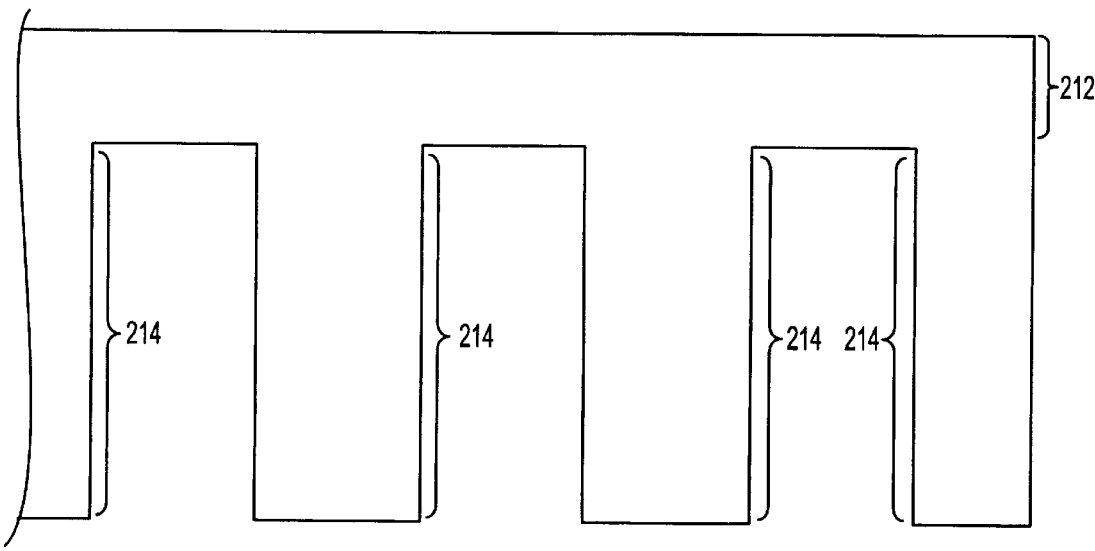

Thus, as illustrated in FIG. 25, when additional parallel-connected switching elements and capacitors are necessary to provide additional power capabilities, the legs 214 are made longer and the drive components on the legs 214 are replicated for each additional parallel set of switching elements and capacitors. There is consequently no need to provide a different main body 212, and as a result, a manufacturing expedience is achieved in that one type of main body 212 is usable by all of the motor controllers, regardless of the power rating desired.

Although the motor controller of the present invention has been described with reference to the preferred three-phase embodiment and the preferred motor structure, it is understood that the present invention is not limited to such arrangements. The active hysteresis control provided by the motor controller of the present invention, for example, may be applied to many other types of motors, including those which do not operate using three-phase current.

As illustrated in FIG. 23, typically a motor controller for a three-phase motor will have three current sensors 208, one for each phase of the motor. One of the current sensors, however, can be eliminated according to another aspect of the present invention.

Figure 26:
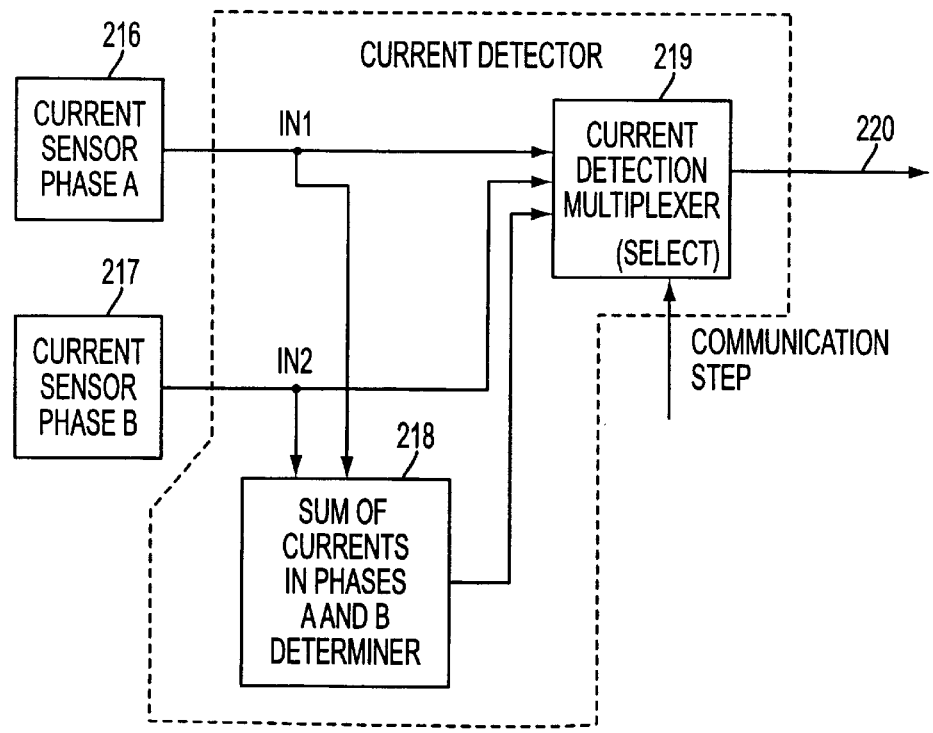
FIG. 26 is a block diagram of a current detecting device according to the present invention.

As illustrated in FIG. 26, a current detector 215 for a three-phase motor, according to another aspect of the present invention, can provide outputs indicative of current flowing through each of three phase windings in a motor, based on detected magnitudes of current flowing through only two of the phase windings.

A preferred embodiment of such a current detector includes a first input port IN1 for connection to a first current sensing device 216 which senses current in a first winding of the three-phase motor; a second input port IN2 for connection to a second current sensing device 217 which senses current in a second winding of the three-phase motor; summing circuitry 218 connected to the first and second input ports IN1,IN2, for providing a sum of the magnitudes of current in the first and second windings of the three-phase motor; and a switching mechanism 219 for providing, as an output signal 220 during a commutation step:

a signal indicative of the current in the first winding if the current in the first winding was turned on at a beginning of a preceding commutation step;

a signal indicative of the current in the second winding if the current in the second winding was turned on at the beginning of the preceding commutation step, and a signal indicative of the sum if current in a third one of the windings was turned on at the beginning of the preceding commutation step.

Figure 27:
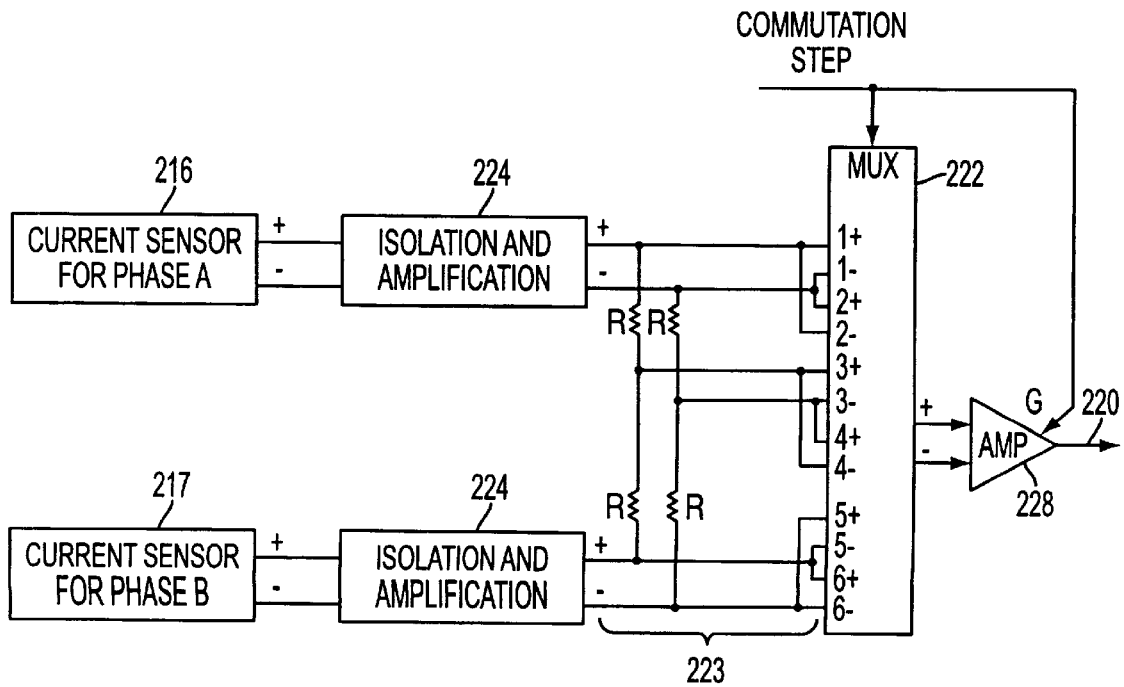
FIG. 27 is a block diagram of a preferred embodiment of the current detecting device illustrated in FIG. 26.

The arrangement illustrated in FIG. 26 preferably is achieved using the circuitry illustrated in FIG. 27. According to FIG. 27, a 12-to-2 multiplexer 222 is connected to a signal indicative of a present commutation step of the motor. The 12-to-2 multiplexer 222 is arranged so that, depending on which commutation step is present, the multiplexer 222 connects its output port to one of the signal pairs at its input ports 1+, 1−, 2+, 2− . . . 6+, 6−. A resistor network 223 provides an average of signal values from the two current sensors 216,217 and isolation and amplification circuitry 224 associated therewith.

Preferably, the current sensors 216,217 are shunt resistors placed in the power supply lines for two of the motor's phases. The isolation and amplification circuitry 224 may consist of the isolation and amplification circuitry commercially available from Hewlett Packard under part number HCPL 7820, or the like. Alternatively, the current sensors 216,217 may be realized using Hall effect sensors or other current detecting devices.

The circuitry illustrated in FIG. 27 advantageously provides current detection using only two current sensors.

In commutation step 1 of FIG. 21, for example, phase B was turned on at the beginning of the preceding commutation step and remains on, even though negative. The multiplexer 222 therefore selects input ports 5+ and 5− because these ports correspond to the reverse polarity of the output from the current sensor 217 of the B phase and its associated isolation and amplification circuit 224.

In commutation step 2, phase A was turned on at the beginning of the preceding commutation step and remains on. Accordingly, the multiplexer 222 selects input ports 1+ and 1− because these ports correspond to the output from the current sensor 216 of the A phase and its associated isolation and amplification circuit 224. Because the current in the A phase during commutation step 2 is positive, there is no need to use the inverse polarity provided by input ports 2+ and 2−.

Next, in commutation step 3, it is known that phase C was turned on at the beginning of the preceding commutation step and remains on, though negative. The current in phase C, however, cannot be detected because the present invention eliminates that particular current sensor. Instead, it is noted that the current in Phase A drops from a positive value at the beginning of the third commutation step, while the current in phase B is switched to the same positive value. The multiplexer 222 therefore selects input ports 3+ and 3− because these ports correspond to the average of the outputs from the current sensors 216,217 of the A and B phases and their associated isolation and amplification circuits 224. Because the currents in the A and B phases are being switched to and from a positive value during commutation step 3, there is no need to use the inverse polarity provided by input ports 4+ and 4−.

The desired sum then is obtained by doubling the gain of the amplifier 228 (or combination of amplifiers) connected to the output of the multiplexer 222 in response to detection of the third commutation step.

In commutation step 4, phase C was turned on in the positive direction at the beginning of the preceding commutation step and remains on. Accordingly, the multiplexer 222 selects input ports 6+ and 6− because these ports correspond to the output from the current sensor 217 of the B phase and its associated isolation and amplification circuit 224.

In commutation step 5, phase A was turned on at the beginning of the preceding commutation step and remains on, though negative. Accordingly, the multiplexer 222 selects input ports 2+ and 2− because these ports correspond to the reverse polarity output from the current sensor 216 of the A phase and its associated isolation and amplification circuit 224. Because the current in the A phase during commutation step 4 is in the reverse direction, the inverse polarity provided by input ports 2+ and 2− becomes desirable.

Lastly, in commutation step 6, phase C was turned on at the beginning of the preceding commutation step and remains on. The current in Phase A increases from a negative value to zero at the beginning of the sixth commutation step, while the current in phase B is switched to the negative value. The multiplexer 222 therefore selects input ports 4+ and 4− because these ports correspond to the average of the outputs from the current sensors 216,217 of the A and B phases and their associated isolation and amplification circuits 224. Because the currents in the A and B phases are being switched to and from a negative value during commutation step 6, the inverse polarity provided by input ports 4+ and 4− becomes desirable.

During commutation step 6, the gain of the amplifier 228 again is doubled to achieve the desired sum indicative of the current in phase C. Only one such amplifier 228 is illustrated. The amplifier 228 is responsive to the present commutation step, or any other signal indicative of whether input ports 3+, 3−, 4+, 4− are being selected. When the input ports 3+, 3−, 4+, 4− are being selected, the amplifier 228 provides a gain equal to twice the gain that is provided when the input ports 1+,1−,2+,2−,5+,5−,6+ and 6− are selected.

During subsequent commutation steps, the multiplexer 222 repeats the foregoing selection process. Notably, the current readings in each of the foregoing commutation steps is being taken from one of two measured currents which has been on longer than the present commutation step, or from a sum of two currents which are being switched in opposite directions at the beginning of the present commutation step. This arrangement, therefore, prevents current spikes which otherwise might appear in the current phase which has been on. Also, the foregoing circuitry advantageously requires only two current sensors to monitor current in a three phase motor.

Figure 28:
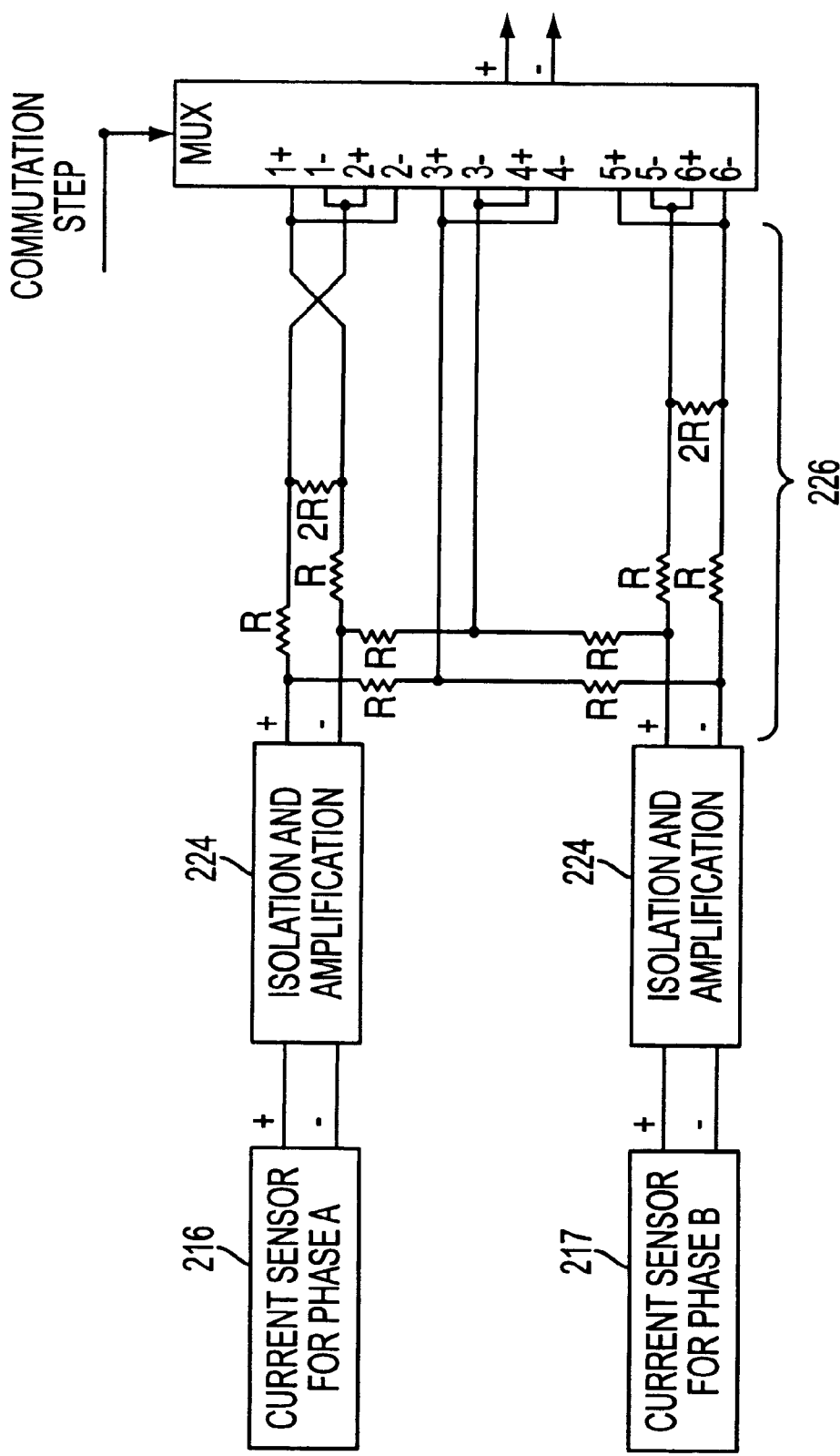
FIG. 28 is a block diagram of an alternative embodiment of the current detecting device illustrated in FIG. 26.

One of the many alternatives to the circuitry illustrated in FIG. 27 is the circuit illustrated in FIG. 28. The circuit in FIG. 28 is substantially the same as that of FIG. 27, except that the resistor network 226 shown in FIG. 28 provides a signal corresponding to the sum of the signal values from the two current sensors 216,217 and the isolation and amplification circuitry 224 associated therewith. Accordingly, the amplifier 228 (or combination of amplifiers) capable of providing two different gains is not necessary. The results achieved by the circuit illustrated in FIG. 27 also are achieved by the circuit illustrated in FIG. 28.

When the circuitry illustrated in FIGS. 26–28 is used, the microcontroller 202 requires only one input port for current sensing. The appropriate current-indicative voltage is provided automatically by signal 220.

Figure 29:
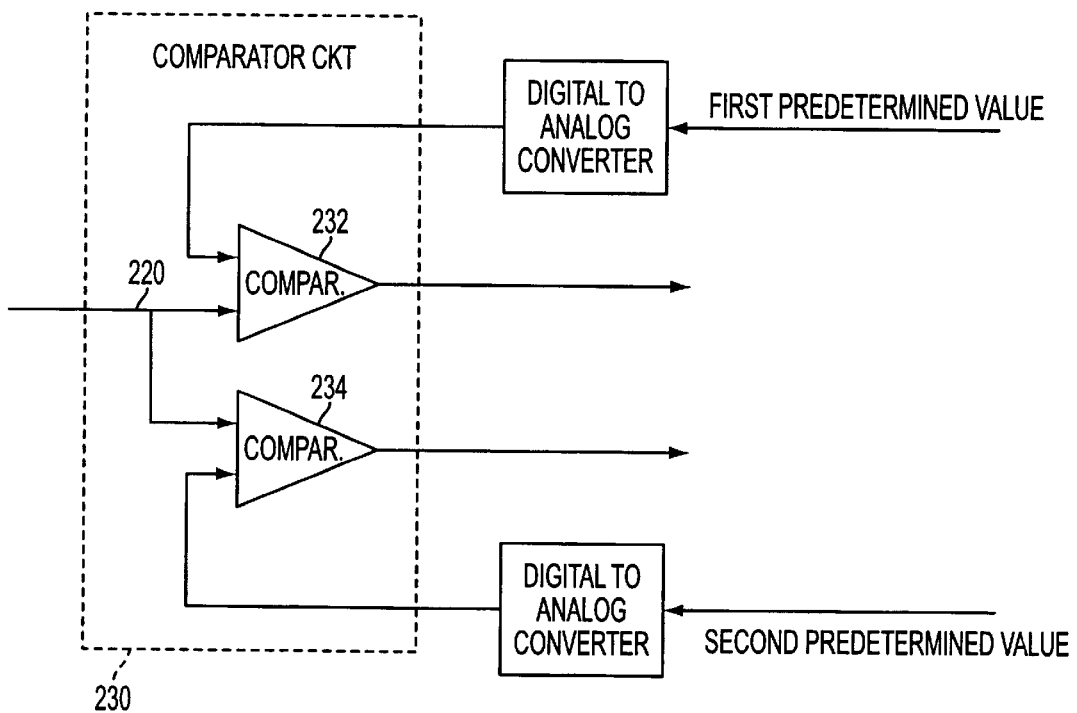
FIG. 29 illustrates a comparator circuit in accordance with the present invention.

In addition, when hysteresis-based control of the current is performed, as described above, the signal 220 can be provided to a comparator circuit 230, such as that which is illustrated in FIG. 29.

The comparator circuit 230 includes two individual comparators 232,234. Digital-to-analog converters 236,238 are connected to the comparators 232,234 and receive digital signals indicative of the first and second predetermined values. The latter are converted into analog form by the digital-to-analog converters 236,238.

The comparator 232 compares the current-indicative signal 220 to the first predetermined value, and provides an output signal indicating whether the first predetermined value has been reached or exceeded. The comparator 234, by contrast, compares the current-indicative signal 220 to the second predetermined value, and provides an output signal indicating whether the current-indicative signal represents a current level which is at or below the second predetermined value.

The output signals from the comparators 232 and 234 can be connected via appropriate logic to the switches SW1, SW2, SW3, or alternatively to the microcontroller 202. In either case, the circuitry illustrated in FIG. 29 provides indications of whether the current being provided by the motor controller 200 remains within a particular hysteresis band associated with a desired value of intermediate current.

If the microcontroller 202 is capable of providing analog signals indicative of the first and second predetermined values, it is understood that there would be no need for the digital-to-analog converters 236,238.

Any one of the above-described motors can be controlled using any of the above-described motor controllers which, in turn, can derive some or all of its current measurements from a circuit similar to that which is illustrated in FIGS. 26–29.

As indicated above, the motors, controllers, and current detectors of the present invention are particularly well-suited for use on electric vehicles, though it is understood that their use is not limited in this regard.

With reference to FIG. 22, in an electric vehicle according to the present invention, the battery voltage $V_{supp}$ is disconnected when the driver arrives at a destination. Such disconnection of the battery voltage $V_{supp}$ can be achieved using a switch IGN which is analogous to an ignition switch in a gasoline-powered vehicle. The capacitance C, however, stores electrical power even after the switch IGN is opened. The charge on the capacitance C discharges at a moderate rate because of leakage, but eventually, at around 50 volts, the decay in charge slows to the point where little charge is lost over long periods of time.

It would be desirable to have circuitry capable of automatically discharging the residual voltage in the power bus to which the capacitance C is connected.

Therefore, according to another aspect of the present invention, a discharge device is provided for automatically discharging a residual voltage on a power bus after the residual voltage drops below a predetermined value.

Figure 30:
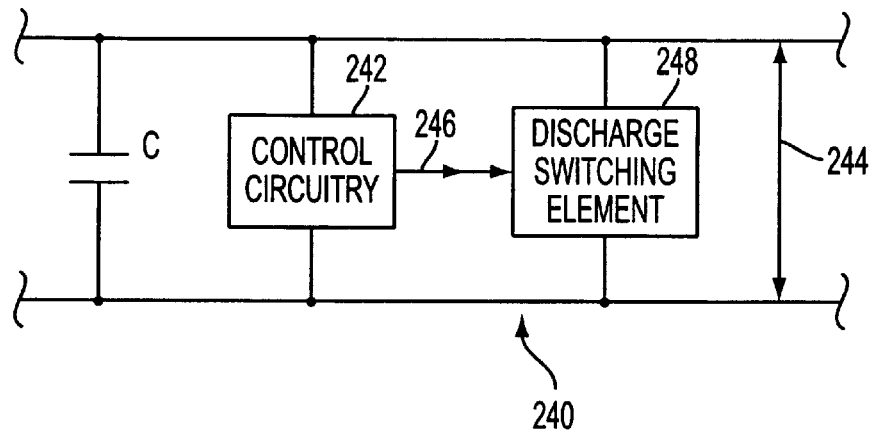
FIG. 30 is a block diagram of a discharge device according to the present invention.

With reference to FIG. 30, the discharge device 240 includes control circuitry 242 connectable to the power bus 244 and capable of determining whether the residual voltage has dropped below the predetermined value and also capable of providing a control signal 246 indicative thereof. The discharge device 240 further includes a discharge switching element 248 responsive to the control signal 246 from the control circuitry 242.

The discharge switching element 248 is arranged so that when the control signal 246 indicates that the residual voltage has dropped below the predetermined value (e.g. 50 volts), the discharge switching element 248 effects discharging of the residual voltage.

Figure 31:
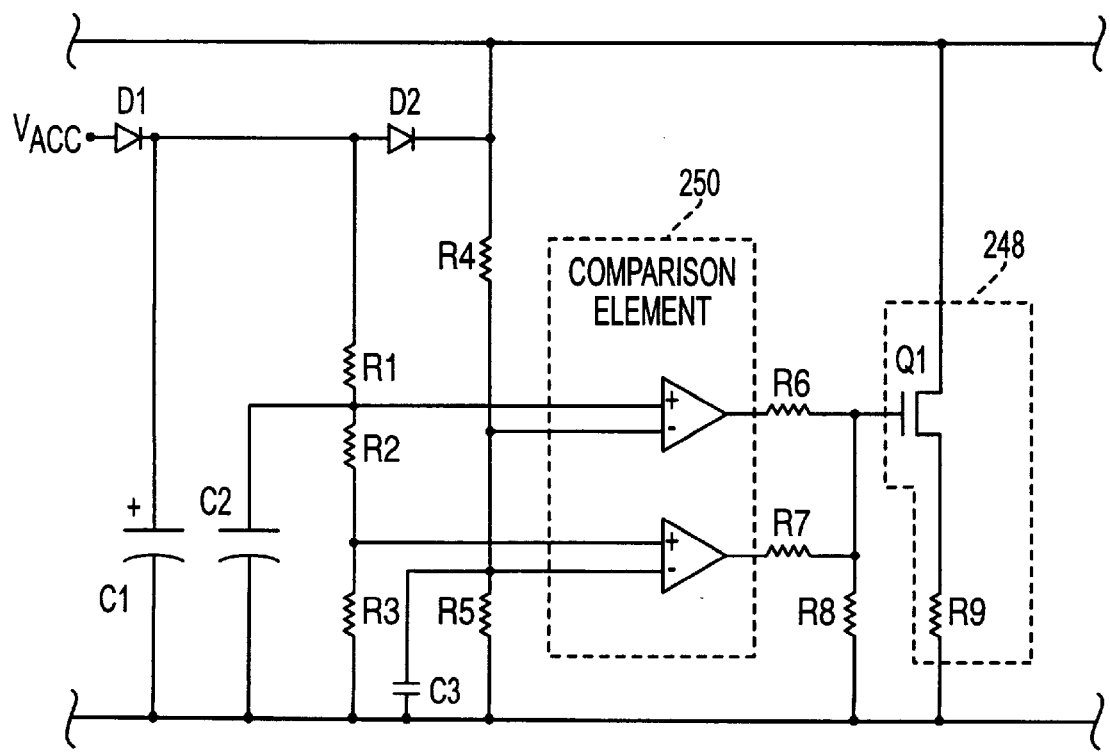
FIG. 31 schematically illustrates a preferred embodiment of the discharge device illustrated in FIG. 30.

Preferably, the discharge device 240 of the present invention is implemented using the circuitry illustrated in FIG. 31.

In this regard, the discharge switching element 248 may include a transistor with heat sink properties sufficient to convert a discharge energy associated with the residual voltage into heat. Preferably, a transistor Q1 with a power rating of 10 Watts is used along with a 12Ω, 1 Watt rated resistor R9 to discharge the energy associated with the residual voltage. An exemplary transistor Q1 is commercially available under part number IRF720 from International Rectifier.

The control circuitry 242 preferably includes a comparison element 250 for comparing a voltage indicative of voltage on the power bus to a reference voltage. This reference voltage, for example, may be taken from a 15 volt power supply $V_{ACC}$ provided by the motor controller. Since this 15 volt power supply $V_{ACC}$ will diminish as the residual voltage on the bus is dissipated, a temporary back-up source of reference voltage is achieved using, for example, a capacitor C1. Preferably, the comparison element is implemented using a single chip carrying two comparators.

The comparison element 250 preferably includes a plurality of comparators which turn on at different voltage levels, resulting in successively higher currents through the discharge switching element 248. In this way, the power dissipated in the discharge switching element 248 is maintained near but below the power rating of the discharge switching element 248.

Preferably, the discharge device 240 includes an element capable of automatically discharging the back-up source (e.g., C1) when the residual voltage drops below the reference voltage. In this regard, a diode D2 is provided between the capacitor C1 and the power bus.

The discharge device 240 also should include discharge inhibiting circuitry for inhibiting discharge operation of the discharge switching element 248 during initial powering up of the power bus. In this regard, a capacitor C2 is connected between resistor R1 and the ground terminal of the power bus. The capacitor C2 advantageously inhibits actuation of the transistor Q1 while the power bus is being powered up. After the capacitor is charged to a normal operating level, the discharge switching element 248 is again enabled.

The following table provides preferred values for the circuit elements illustrated in FIG. 31. The values provided in the table cause the discharge device 240 to begin discharging the power bus when the voltage thereon drops to about 50 volts.

| REF. NO. | COMPONENT DESCRIPTION |
| --- | --- |
| D1 | IN 4148 diode |
| D2 | IN 4005 diode |
| C1 | 470 μFarad capacitor |
| C2 | 4.7 μFarad capacitor |
| C3 | 0.1 μFarad capacitor |
| Q1 | IRF720 transistor, with a 10 Watt rating and heat sink capabilities |
| R1 | 740 kΩ resistor |
| R2 | 3.6 kΩ resistor |
| R3 | 18 kΩ resistor |
| R4 | 4.7 MegaΩ resistor |
| R5 | 56 kΩ resistor |
| R6 | 160 kΩ resistor |
| R7 | 470 kΩ resistor |
| R8 | 82 kΩ resistor |
| R9 | 12 Ω resistor, with a 1 Watt power rating |

The features described above in connection with the windings, stators, motor, controller, discharge device, and current detection device of the present invention provide significant advantages on an individual basis over some or all of the conventional arrangements. The combination, however, of two or more of the features described above provides even greater advantages, especially since such a combination tends to maximize versatility and efficiency, while at the same time reducing overall weight.

The present invention, of course, is not limited to the foregoing exemplary embodiments. To the contrary, the present invention is limited only by the full scope of the appended claims.

We claim:

1. A dual stator motor with selectively variable air gaps, said dual stator motor comprising:

first and second stators which are axially movable;

a rotor rotatably mounted between the first and second stators, for rotation in response to magnetic fields generated by said first an second stators;

a first mechanism for moving the first stator axially with respect to the rotor to vary a first air gap between said rotor and the first stator during operation of the motor; and a second mechanism for moving the second stator axially with respect to the rotor to vary a second air gap between said rotor and the second stator during operation of the motor.

2. The dual stator motor of claim 1, further comprising a coupling mechanism for coupling actuation of the first mechanism to actuation of the second mechanism so that said first air gap remains substantially the same as said second air gap.

3. The dual stator motor of claim 1, wherein each of said first and second mechanisms includes:

a cam hub having camming members; and stator camming elements mounted to a respective one of said first and second stators, said stator camming elements matching the camming members of the cam hub, said cam hub being rotatable in a first direction wherein said camming members of the cam hub urge said stator camming elements away from the rotor and a second direction wherein said camming members of the cam hub permit said stator camming elements to move closer to said rotor.

4. A dual stator motor with selectively variable air gaps, the dual stator motor comprising:

first and second stators which are axially movable;

a rotor rotatable mounted between the first and second stators, for rotation in response to magnetic fields generated by the first and second stators;

a first mechanism for moving the first stator axially with respect to the rotor to vary a first air gap between the rotor and the first stator; and a second mechanism for moving the second stator axially with respect to the rotor to vary a second air gap between the rotor and the second stator;

wherein each of the first and second mechanisms further includes:

a cam hub having camming members;

stator camming elements mounted to a respective one of the first and second stators, the stator camming elements matching the camming members of the cam hub, the cam hub being rotatable in a first direction wherein the camming members of the cam hub urge the stator camming elements away from the rotor and a second direction wherein the camming members of the cam hub permit the stator camming elements to move closer to the rotor; and at least one resilient member arranged so as to urge the respective one of the first and second stators away from the rotor with a counter-active force which counteracts an attractive force between the respective stator and the rotor, the resilient member being arranged so that the counter-active force increases as the respective one of the first and second stators approaches a position associated with a minimum air gap.

5. A dual stator motor with selectively variable air gaps, the dual stator motor comprising:

first and second stators which are axially movable;

a rotor rotatably mounted between the first and second stators, for rotation in response to magnetic fields generated by the first and second stators;

a first mechanism for moving the first stator axially with respect to the rotor to vary a first air gap between the rotor and the first stator; and a second mechanism for moving the second stator axially with respect to the rotor to vary a second air gap between the rotor and the second stator;

wherein each of the first and second mechanisms further includes:

a cam hub having camming members;

stator camming elements mounted to a respective one of the first and second stators, the stator camming elements matching the camming members of the cam hub, the cam hub being rotatably in a first direction wherein the camming members of the cam hub urge the stator camming elements away from the rotor and a second direction wherein the camming members of the cam hub permit the stator camming elements to move closer to the rotor;

at least one resilient member arranged so as to urge the respective one of the first and second stators away from the rotor with a counter-active force which counteracts an attractive force between the respective stator and the rotor, the resilient member being arranged so that the counter-active force increases as the respective one of the first and second stators approaches a position associated with a minimum air gap; and an additional resilient member for positively loading the respective one of the first and second stators toward the rotor so that the camming members remain in contact with the stator camming elements.

* * * * *